United States Patent [19]

Weispfenning et al.

[11] Patent Number: 5,136,439
[45] Date of Patent: Aug. 4, 1992

[54] SECTORED SERVO POSITION DEMODULATOR SYSTEM

[75] Inventors: Gerald L. Weispfenning, St. Paul; Lloyd C. Goss, Bloomington, both of Minn.

[73] Assignee: Seagate Technology, Inc., Scotts Valley, Calif.

[21] Appl. No.: 415,053

[22] Filed: Sep. 29, 1989

[51] Int. Cl.$^5$ .......................................... G11B 5/596
[52] U.S. Cl. ............................ 360/77.08; 360/77.02; 360/29
[58] Field of Search ................... 360/77.02–77.05, 360/77.07–77.11, 78.04–78.14, 135, 46, 29; 369/43, 44.25, 44.34

[56] References Cited

U.S. PATENT DOCUMENTS

| 4,297,734 | 10/1981 | Laishley et al. | 360/78.06 |
| 4,414,589 | 11/1983 | Oliver et al. | 360/77.08 |
| 4,669,004 | 5/1987 | Moon et al. | 360/77.08 |
| 4,679,103 | 7/1987 | Workman | 360/77.08 |

OTHER PUBLICATIONS

*Head Positioning in a Large Disc Drive*, Hewlett-Packard Journal, Jan. 1984 by Frank Bell, Eric W. Johnson, R. Keith Whitaker, and Roger V. Wilcox.

Primary Examiner—Aristotelis Psitos
Assistant Examiner—Steven R. Garland
Attorney, Agent, or Firm—Kinney & Lange

[57] ABSTRACT

A demodulator system demodulates position information signals provided by a transducer in response to position information. The position information is read from a quadrature field and a normal field on a disk in a data storage system. A rectifier rectifies the position information signals to provide rectified position signals. An integrating capacitor integrates the rectified position signals to produce position error signals representative of trasducer position.

15 Claims, 17 Drawing Sheets

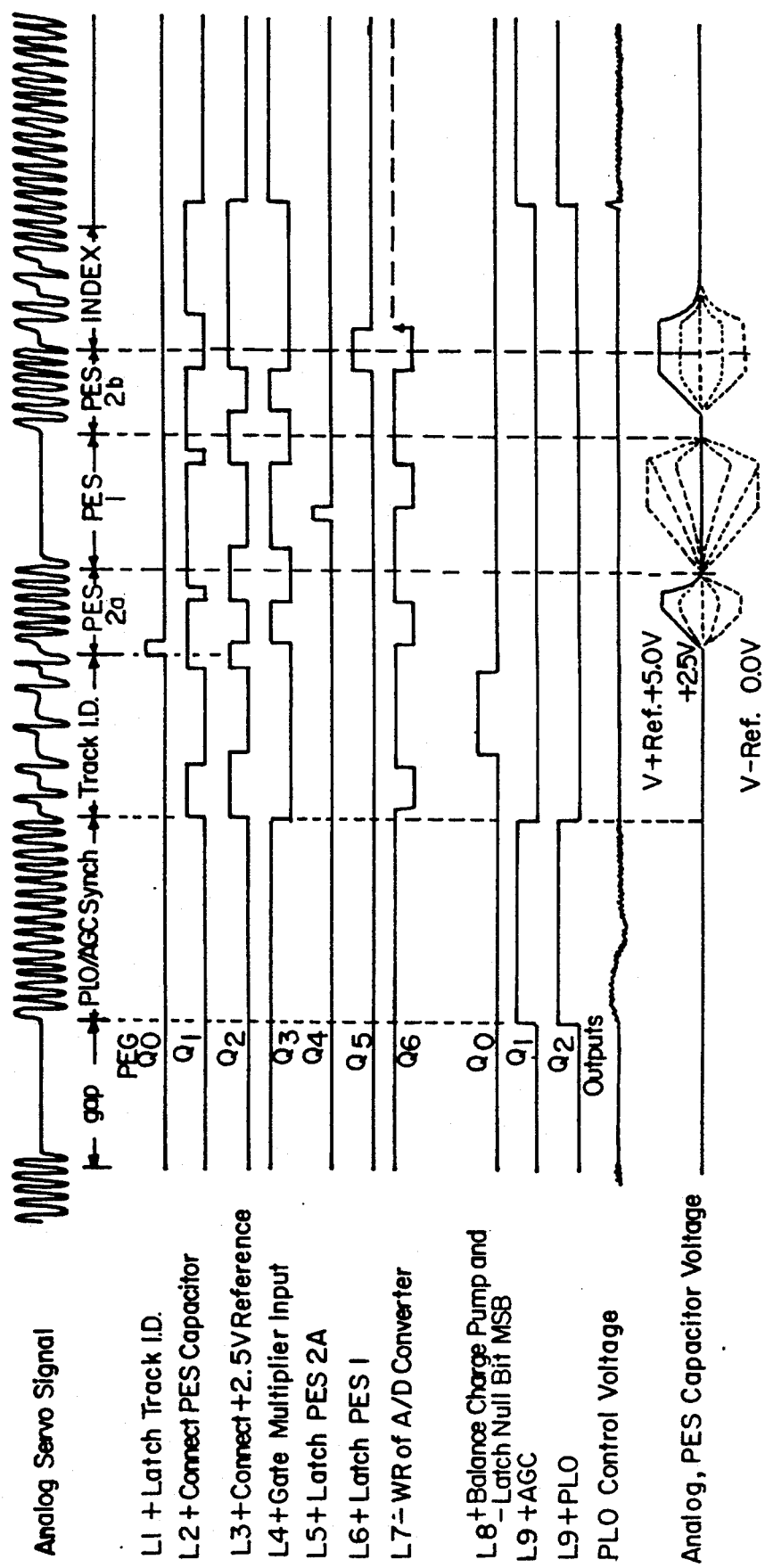

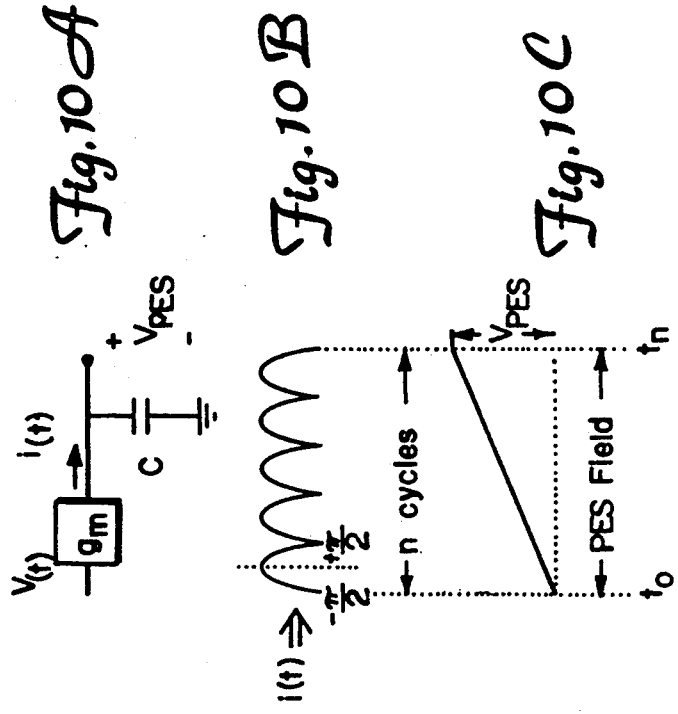
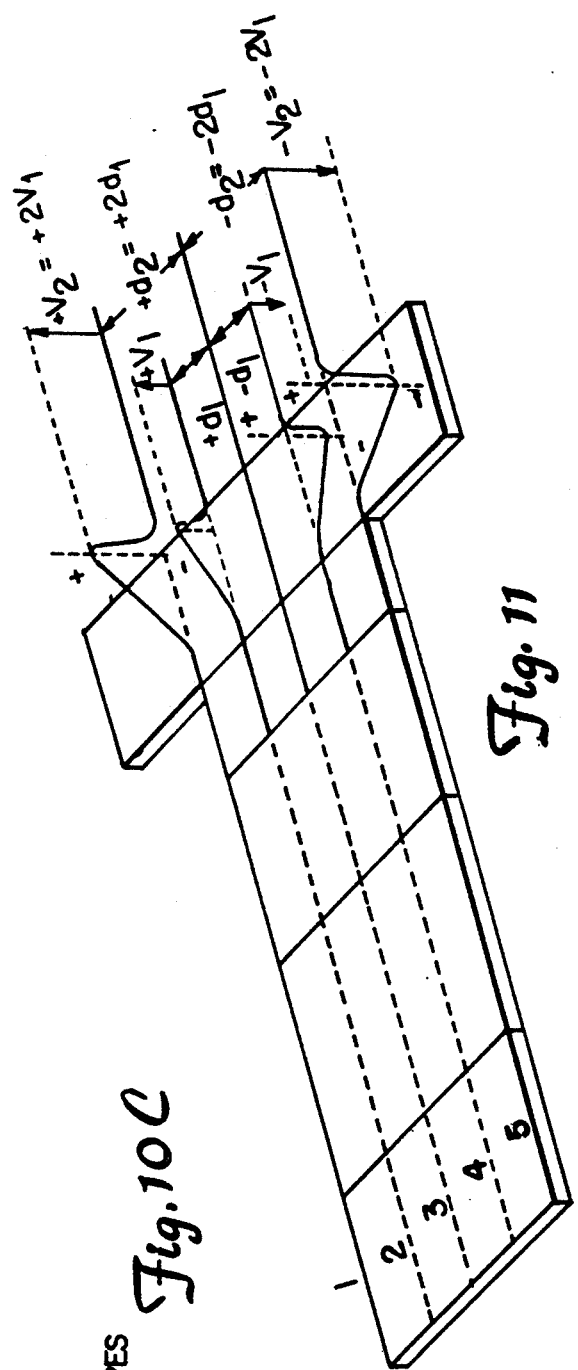
Fig. 10A
Fig. 10B
Fig. 10C
Fig. 11

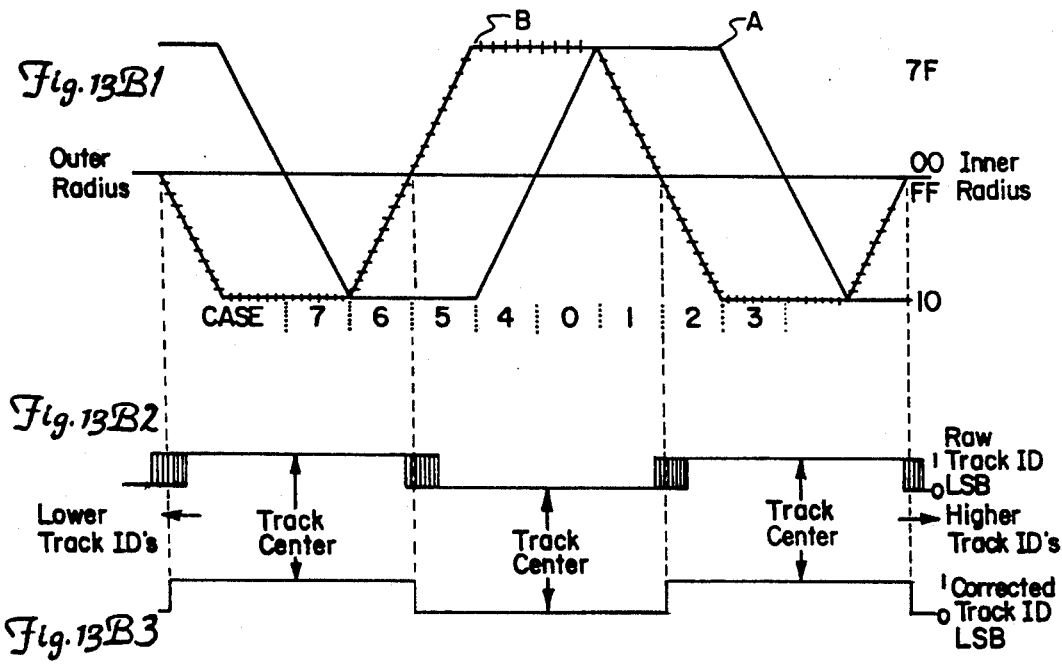
*Fig. 13B1*
*Fig. 13B2*
*Fig. 13B3*
TRUTH TABLE
| Case | PES 1 Sign Bit | PES 2 Sign Bit | Raw TRK ID LSB | Corrected TRK ID LSB | Correction Number Base 10 | Correction Number 2's Complement |
|---|---|---|---|---|---|---|
| 0 | 0 | 0 | 0 | 0 | 0 | 00000000000 |
| 1 | 0 | 0 | 1 | 0 | −1 | 11111111111 |
| 2 | 0 | 1 | 0 | 1 | +1 | 00000000001 |
| 3 | 0 | 1 | 1 | 1 | 0 | 00000000000 |
| 4 | 1 | 0 | 0 | 0 | 0 | 00000000000 |
| 5 | 1 | 0 | 1 | 0 | +1 | 00000000001 |
| 6 | 1 | 1 | 0 | 1 | −1 | 11111111111 |
| 7 | 1 | 1 | 1 | 1 | 0 | 00000000000 |
*Fig. 13C*
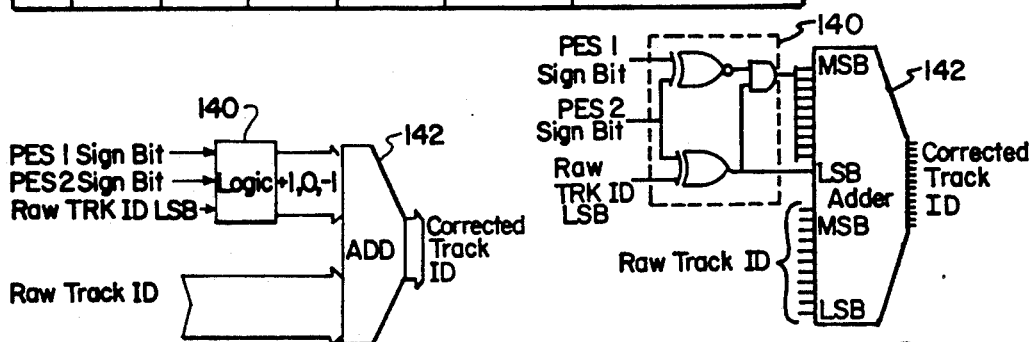
*Fig. 13D*
*Fig. 13E*

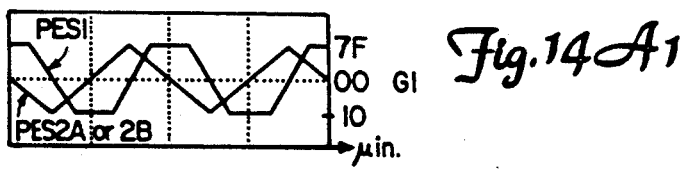
Fig. 14A1
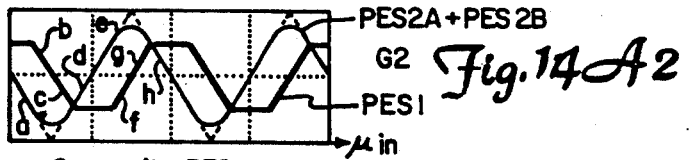
Fig. 14A2
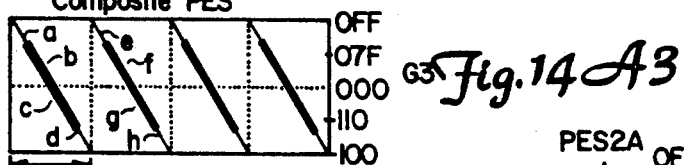
Fig. 14A3
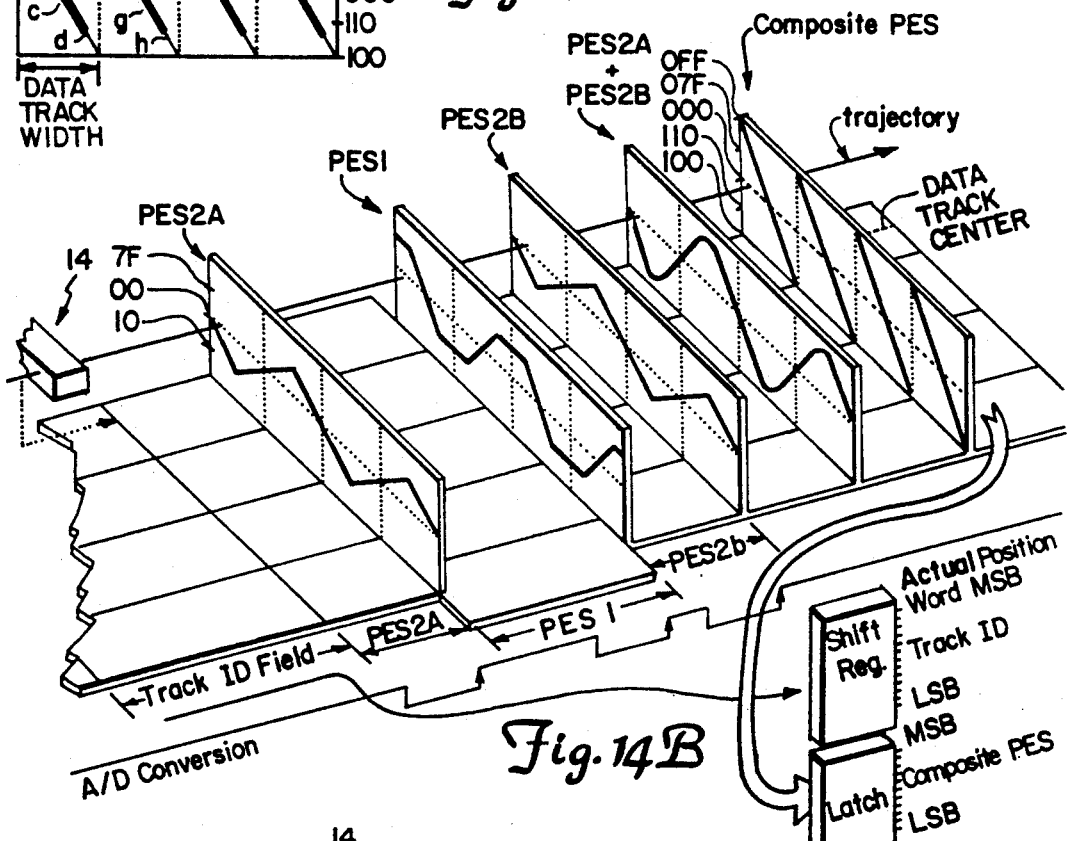
Fig. 14B
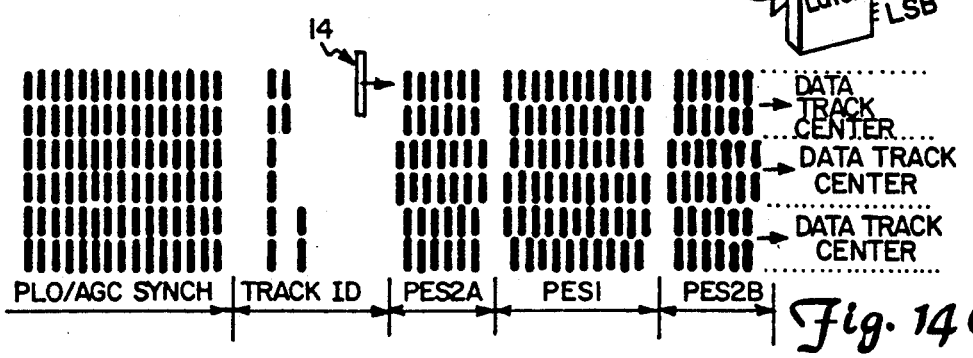
Fig. 14C

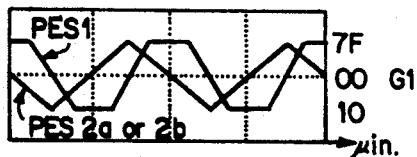
Fig. 16A1
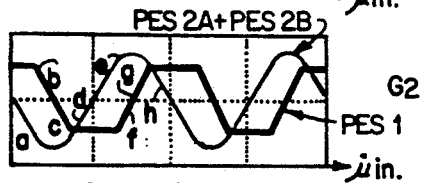
Fig. 16A2
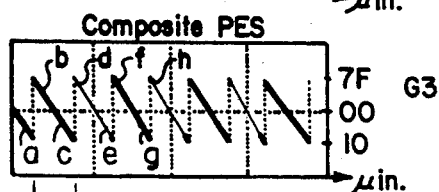
Fig. 16A3
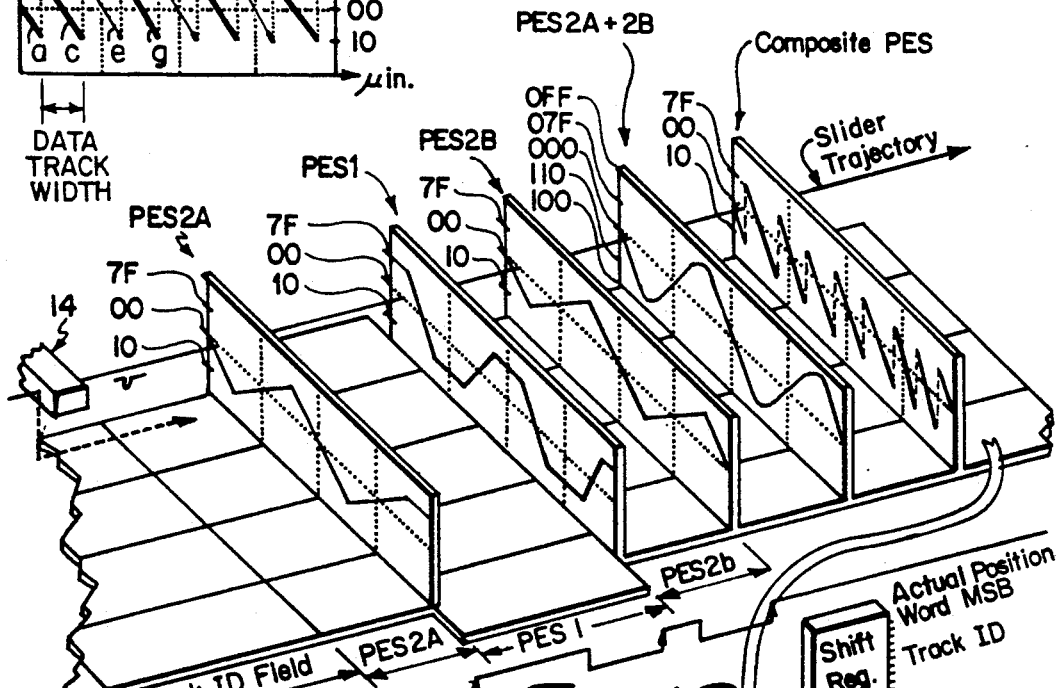
Fig. 16B
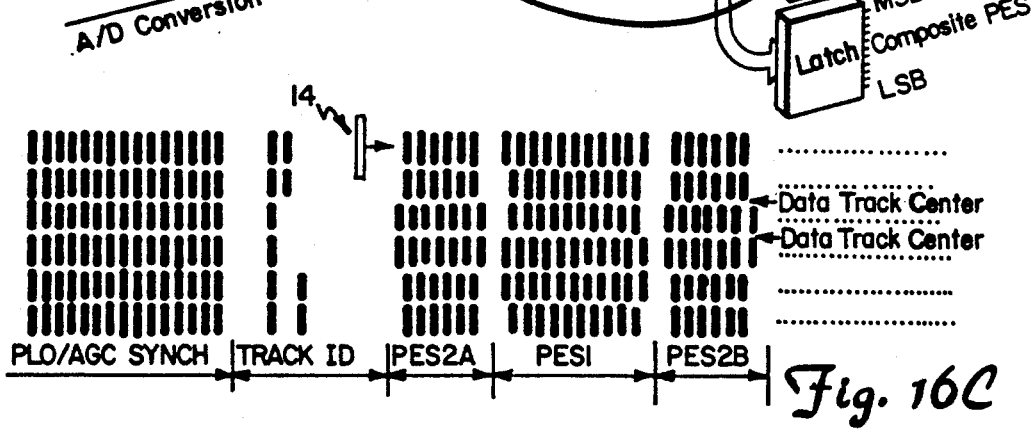
Fig. 16C

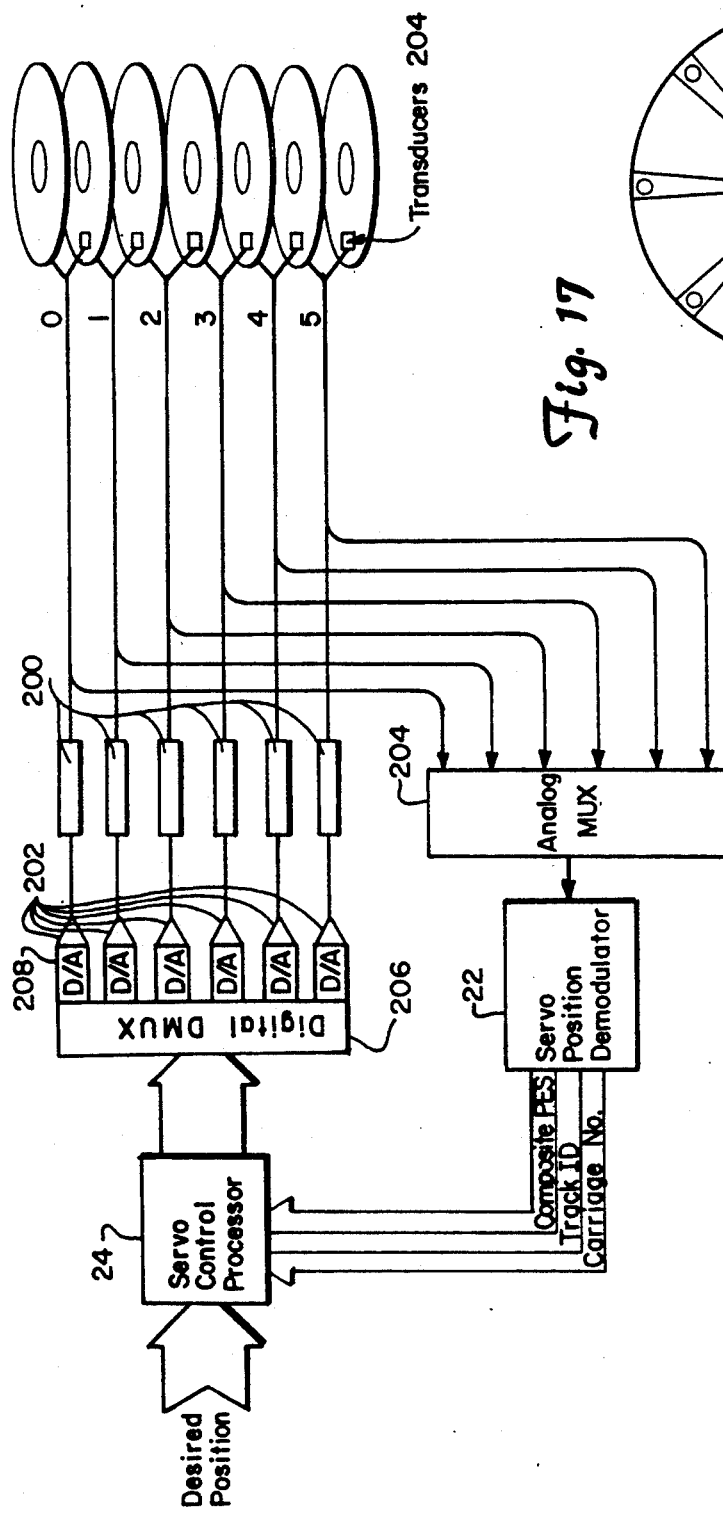
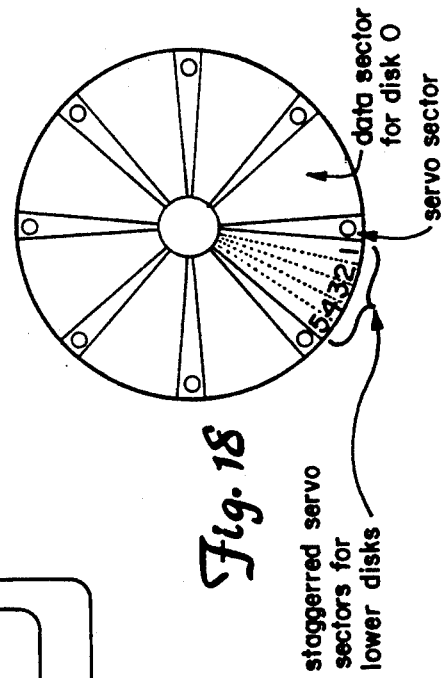
Fig. 17
Fig. 18

SECTORED SERVO POSITION DEMODULATOR SYSTEM

BACKGROUND OF THE INVENTION

1. Field of the Invention.

The present invention relates to positioning a transducer over a disk in a disk file data storage system. More particularly, the present invention relates to demodulation of position information signals provided by the transducer in response to position information read from the disk.

2. Description of the Prior Art.

Disk file data storage systems contain one or more magnetic disks on which data is stored in concentric tracks. A transducer writes, or magnetically encodes, the data on the track. The transducer is also capable of reading the magnetically encoded data from the tracks.

An electromechanical actuator operates within a negative feedback, closed-loop servo system. The actuator moves the transducer radially for track seek operations and holds the transducer directly over a track for track following operations.

A servo transducer reads position information from the disk and provides a position signal which is decoded by a position demodulator and presented in digital form to a servo control microprocessor. The servo control microprocessor essentially compares actual radial position of the transducer over the disk with desired position and commands the actuator to move in order to minimize position error.

In one type of servo system, one disk surface is dedicated to contain servo tracks which are encoded with servo position information. The servo position information in the servo tracks is condensed to evenly spaced sectors. A servo transducer flies over the servo sectors as the disk rotates and produces a sampling effect. The actual position transducer information is updated at the end of each servo sector through the use of track identification information and position error information. The track identification number is prewritten into each servo sector and serves as coarse transducer position information. The position error information is written in the servo sector and represents the distance that the servo transducer is located from the center of the track. This position error information serves as fine transducer position information.

The position error information is generally written in two fields. One is referred to as a quadrature field and the second is called a normal field. Position error information obtained from the normal field or the quadrature field is called a normal or quadrature position sample. By decoding the position samples obtained from these two fields, the off-track position of the transducer is determined relative to the center of the track. The position samples are typically decoded by integrating the analog position signal provided by the transducer which represents the position error information magnetically encoded on the disk. The integrated signal is then converted to a digital signal representing transducer position error.

In the past, two separate, theoretically identical, capacitors were used for integrating signals representing the normal and quadrature position samples. However, although the capacitors were theoretically identical, some difference between the capacitance values often existed. This difference produced an error factor between the normal and quadrature samples. Further, since two capacitors were used for integration in some cases, two analog-to-digital (A/D) converters were required to convert the final analog voltage across each of the capacitors. Using two A/D convertors not only increased the cost of the demodulator, but introduced additional errors due to various off-sets in the A/D converters.

Additionally, in the past, the position samples decoded from the quadrature and normal fields were combined in the analog domain to produce a composite position error signal. This technique increased inaccuracies in the demodulator. These inaccuracies were due to the analog circuits which each had associated off-set errors, gain errors, linearity errors and variation with temperature and which were used for combining the position samples.

Further, before integrating the transducer position signal, and between integrations, it is desirable to keep the initial voltage on the integrating capacitors as close to a zero error level as possible.

For these reasons, there is a need for a more accurate servo position demodulator with a null system which compensates for static or time variable DC offsets in the electronics surrounding the capacitor.

SUMMARY OF THE INVENTION

In the present invention a demodulating system demodulates the position information signals provided by a transducer in response to position information read from a quadrature field and a normal field on a disk in a data storage system. Rectifier means, coupled to the transducer means, rectifies the position information signals using a synchronous demodulation technique to provide rectified position signals. An integrating capacitor, coupled to the rectifier means, integrates the rectified position signals to produce position error signals. The integrating capacitor is used to integrate the rectified position signals corresponding to position information read from both the quadrature field and the normal field.

In one preferred embodiment, the demodulating system is provided with nulling means coupled to the integrating capacitor. The nulling means selectively provides the integrating capacitor with a reference signal to initialize the integrating capacitor.

In a second preferred embodiment, the demodulating system also includes an analog-to-digital (A/D) converter which is coupled to the integrating capacitor. The A/D converter converts the position error signals into logic output signals representative of the position information read from both the quadrature field and the normal field. The A/D converter converts the position error signals into logic output signals before the signals are combined into a composite position error signal.

BRIEF DESCRIPTION OF THE DRAWINGS

FIG. 7 is a timing diagram showing PES capacitor voltage during one servo sector.

FIGS. 10A-10C illustrate the relationship between the final voltage on the PES capacitor and the off-track error of the transducer.

FIG. 11 is a graph of the analog voltage PES1 versus track radius of the transducer in one servo sector.

FIGS. 13B1, 13B2 and 13B3 show the PES voltages and the least significant bit of the raw track identification number as a function of transducer position.

FIG. 13C is a truth table giving the correction number for each case shown in FIGS. 13B1-13B3.

FIG. 13D is a block diagram of the track identification correction feature.

FIG. 13E is one preferred implementation of the track identification correction feature.

FIGS. 14A1, 14A2 and 14A3 show the track crossing plots for the PES fields in a servo-on-data system.

FIG. 14B shows the relationship between the transducer position in the servo sector and the track crossing plots.

FIG. 14C shows the position of the transducer over one track in the servo sector.

FIGS. 16A1, 16A2 and 16A3 show the track crossing plots for the PES fields in a dedicated servo system.

FIG. 16B shows the relationship between the transducer position in the servo sector and the track crossing plots.

FIG. 16C shows the position of the transducer over one track in the servo sector.

FIG. 17 shows a servo system having multiple independent actuators.

FIG. 18 shows a top view of a disk in the servo system shown in FIG. 17.

DETAILED DESCRIPTION OF THE PREFERRED EMBODIMENTS

Introduction

Figure 1:
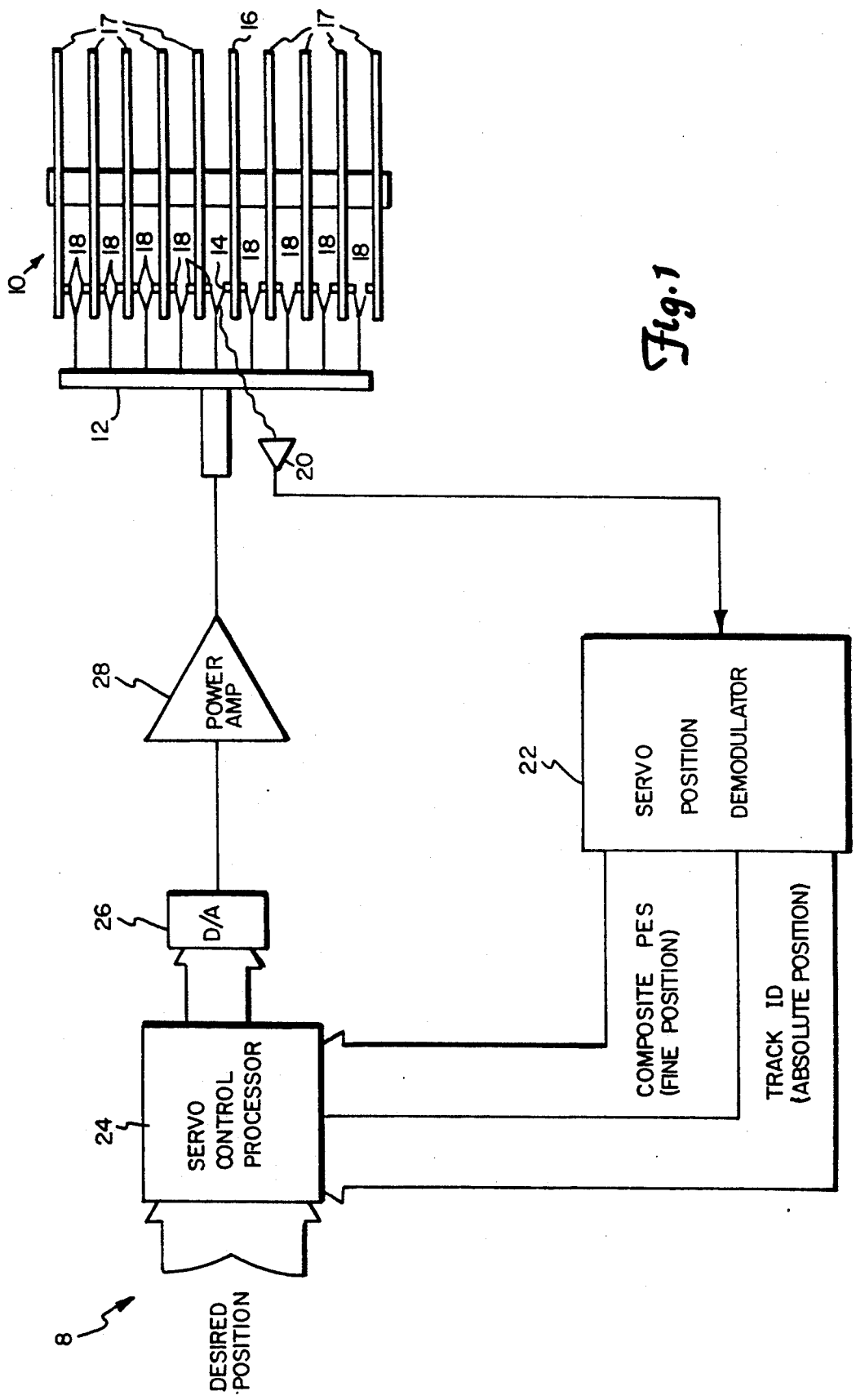
FIG. 1 is a block diagram of one of several possible servo systems of the present invention.

FIG. 1 is a block diagram of negative feedback transducer positioning system 8. A stack of magnetically encodable disks is shown generally at 10. An electromechanical actuator (or E-block) 12 is used to position a servo transducer 14 and several data transducers 18 radially with respect to a servo disk 16 and data disks 17, respectively. The servo transducer is positioned over a desired track on servo disk 16 where it is held while data transducers 18, which are also connected to E-block 1, perform read or write operations.

Servo transducer 14 reads position information from servo disk 16. Servo transducer 14 provides position signals to a preamplifier 20 where it is amplified and provided to servo position demodulator 22. Servo position demodulator 22 decodes the position information and presents it, in digital form, to servo control processor 24. Servo control processor 24 compares the decoded position signal received from servo position demodulator 22 with a desired position signal to determine a transducer position error. The transducer position error represents the difference between the actual position of transducer 14, indicated by the decoded position signal, and the desired position indicated by the desired position signal.

Servo control processor 24 then generates a position correction signal which is converted to an analog signal in digital-to-analog (D/A) converter 26 and applied to actuator 12 through power amplifier 28. The position correction signal causes actuator 12 to move the transducers 14 and 18 radially with respect to the disks 16 and 17 in order to minimize the transducer position error.

Disk Formatting

Figures 2, 3A, 3B:
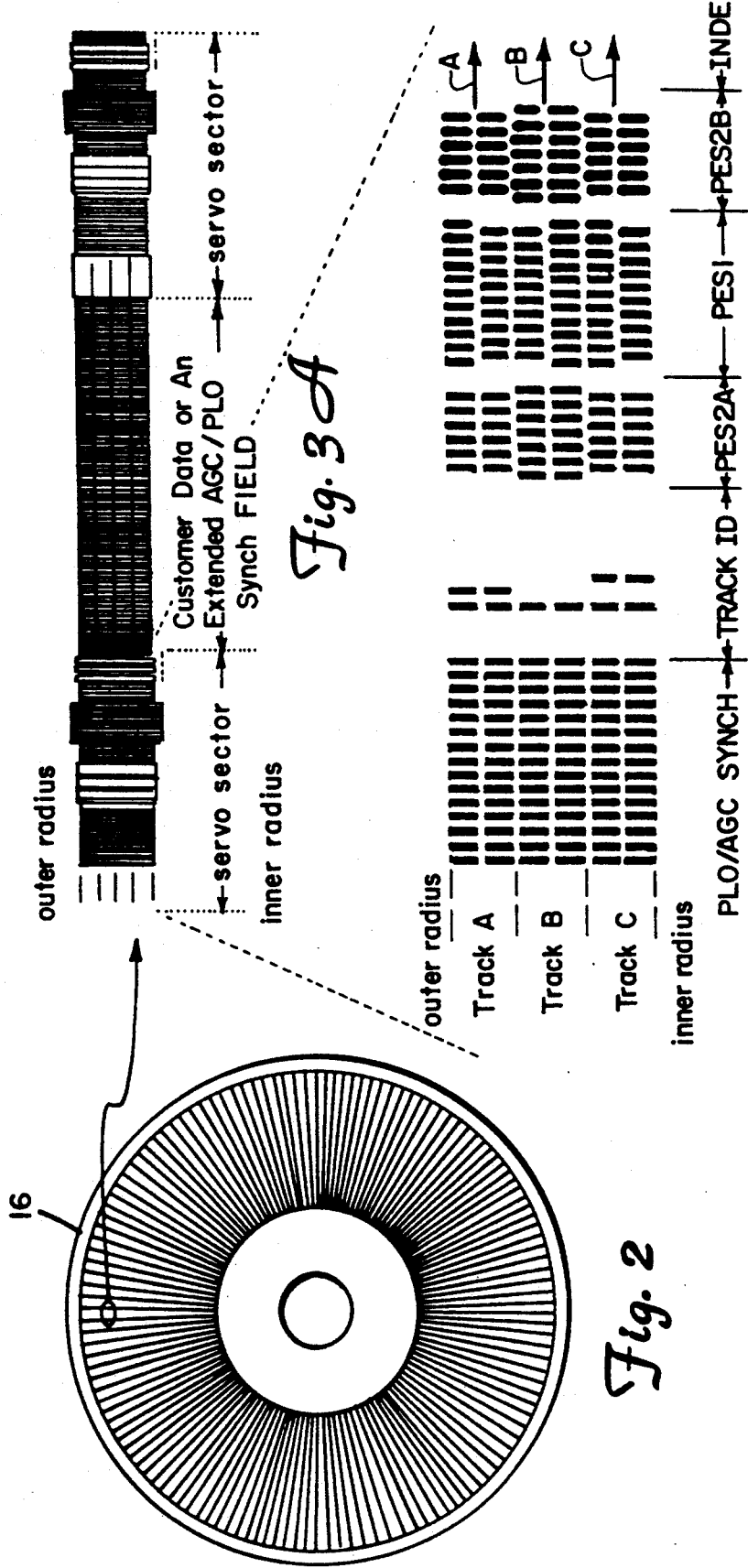
FIG. 2 is a view of a disk surface used in a sectored servo system.
FIG. 3A is an enlarged view of a portion of a servo sector from the disk shown in FIG. 2.
FIG. 3B is a diagram of the format of servo information in one servo sector.

In the preferred embodiment shown in FIG. 1, one disk surface of servo disk 16 is dedicated to contain servo tracks. This surface is shown in FIG. 2. The servo position information in the servo tracks is not continuous but is condensed into evenly spaced sectors. This is known as a sectored servo system. Servo transducer 14, flying over the servo sectors as disk 16 rotates, produces a sampling effect in which the actual, decoded position information provided to servo control processor 24 is updated at the end of each servo sector.

FIG. 3A shows an enlarged portion of a servo sector on servo disk 16. FIG. 3B shows the format of servo information, represented by black and white bars, in one servo sector on disk 16. The black and white bars represent oppositely magnetized areas on a surface coating of servo disk 16. The oppositely magnetized areas are recorded close enough together so that the position signal generated by servo transducer 14 is generally sinusoidal.

FIG. 3B shows that one servo sector contains several distinct fields. The fields include a phase locked oscillator/automatic gain control (PLO/AGC) synch field, a track identification (track ID) field, three Position Error Sample (PES) fields and an index field. FIG. 3B also shows the magnetized areas for three tracks A, B and C on servo disk 16 where the outer radius and inner radius of the tracks is indicated. The direction of the transducer velocity and the track center of each track is indicated by dashed arrows A, B, and C, respectively.

As transducer 14 flies over track A, B, or C on disk 16, it generates a generally sinusoidal position signal. The sinusoidal position signal represents the magnetically encoded information shown in FIG. 3B.

Figure 4A:
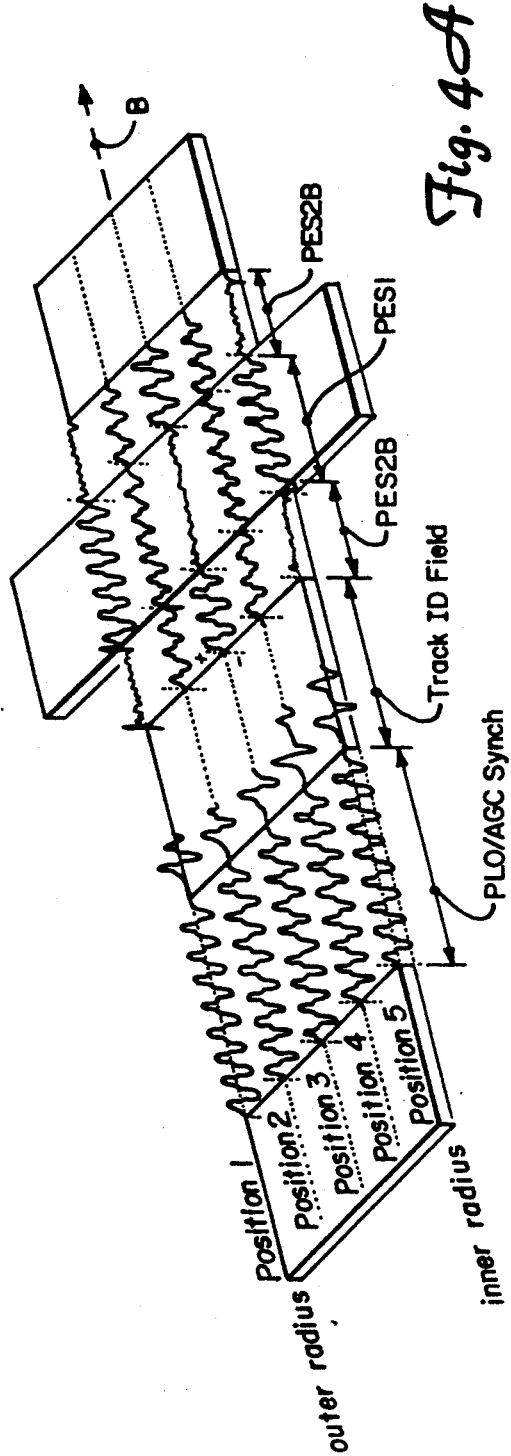
FIG. 4A shows the transducer output signal amplitude as a function of track radius for one servo sector.

FIG. 4A illustrates the position signal generated by transducer 14 as a function of five radial transducer positions along a single track (for example track B) on disk 16 where position 3 represents the center of the track. Positions 1 and 5 represent off-center positions where the center of transducer 14 is radially aligned with, and flying over the outer radius or inner radius of track B, respectively. If transducer 14 were tracking along position a position error equal to the radial distance between position 1 and position 3 would exist. Similarly, if transducer 14 were tracking along position 5, a position error equal to the radial distance between position 3 and position 5 would exist.

Figure 4B:
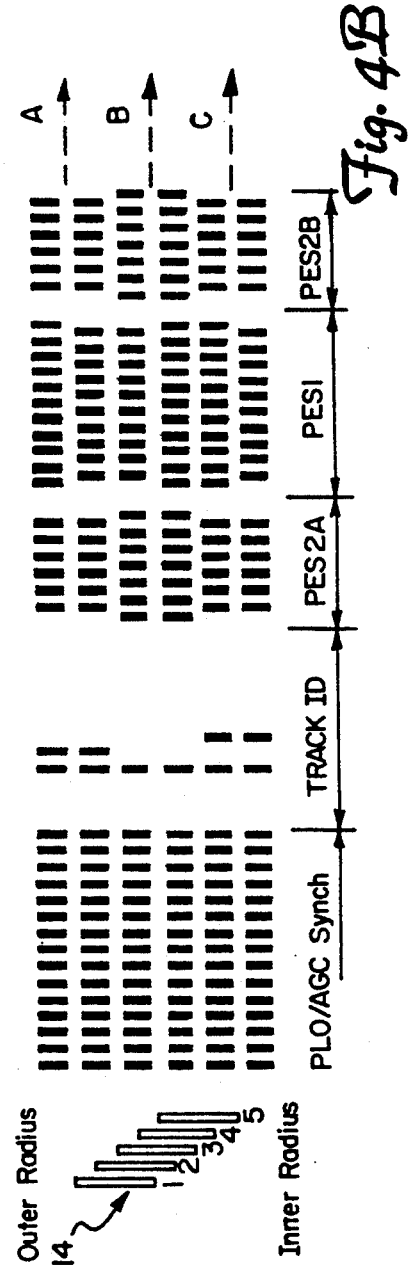
FIG. 4B is a drawing showing the spatial relationship between the transducer and magnetized areas on the disk.

Positions 2 and 4 also represent off-center positions. However, the off-center position error is not as large as the error associated with positions 1 and 5. FIG. 4B shows a spatial relationship between transducer 14, the magnetized areas on disk 16, and each of the transducer positions 1 through 5.

The information encoded in the PLO/AGC synch field is identical in phase and frequency from track to track along disk 16. Therefore, FIG. 4A shows that, as transducer 14 flies over this region, its output position signal is a constant frequency, independent of the particular track over which it is flying and independent of radial position on the track. The information in this field is encoded in this way so that a phase locked oscillator in servo position demodulator 22 can synchronize with the output of transducer 14.

In the track ID field, the track ID number is encoded as a Gray code where only one bit changes from track to track. Each track ID bit is represented by one dibit cell. The amplitude of a dibit depends on the radial position of servo transducer 14. If the dibit amplitude exceeds a given threshold, in this preferred embodiment one half the maximum possible amplitude, the dibit is decoded as a logic 1 in servo position demodulator 22. Otherwise, it is decoded as a logic 0. Therefore, n bit cells define $2^n$ servo tracks on the disk.

In the PES fields (PES1, PES2A and PES2B) the magnetic information encoded on adjacent tracks is recorded 180° out of phase. This produces a checkerboard pattern of magnetization. The magnetic information in the PES fields is also recorded plus or minus 90° out of phase with respect to the magnetic information encoded in the PLO/AGC synch field.

The PES1 field is also called the normal field. The boundary between the magnetization tracks in the normal field are arranged so that they lie on the center line of data tracks. Therefore, when transducer 14 is over the normal field, as transducer 14 moves radially further from center position 3 of track B, the amplitude of the position signal from transducer 14 is larger. Similarly, as transducer 14 moves radially closer to center position 3, the amplitude of the position signal is smaller.

The PES2 field (also known as the quadrature field) is split in half. Half of the quadrature field (the PES2A field) lies on one side of the normal field and half (the PES2B field) lies on an opposite side of the normal field. The quadrature field is encoded with a magnetization pattern which is identical to that of the normal field but which is radially offset from it by half a track width. Therefore, when transducer 14 is over the quadrature field, the position signal provided by transducer 14 is at a maximum amplitude when transducer 14 is flying over track center position 3 and at a minimum amplitude when it is flying over the off-center positions 1 and 5.

The information read from the normal and quadrature fields is referred to as a position error sample. The normal and quadrature fields each produce a separate position error sample. The amplitude of the position signal provided by transducer 14 representing the position error samples is a linear function of the distance of the center of transducer 14 from the track center (position 3). This is shown theoretically in FIG. 5.

Transducer 14 is moving relative to disk 16 in the direction indicated by arrow 30. Transducer 14 may be regarded as being composed of a set of read elements of differential width operating in parallel, whose output signals are added together or integrated to produce the total output voltage of the position signal from transducer 14. For a first order approximation, it is assumed that the position signal from transducer 14 is sinusoidal. Any fringing field effect is neglected. Since the magnetic pattern in the servo sector was originally written 180° out of phase for adjacent tracks, the signal produced by a differential read element, dy, will be defined as either plus or minus Vm Cos (wt). The total output voltage from transducer 14 depends on how many differential read elements produce +Vm Cos (wt) and how many produce −Vm Cos (wt).

Figure 5:
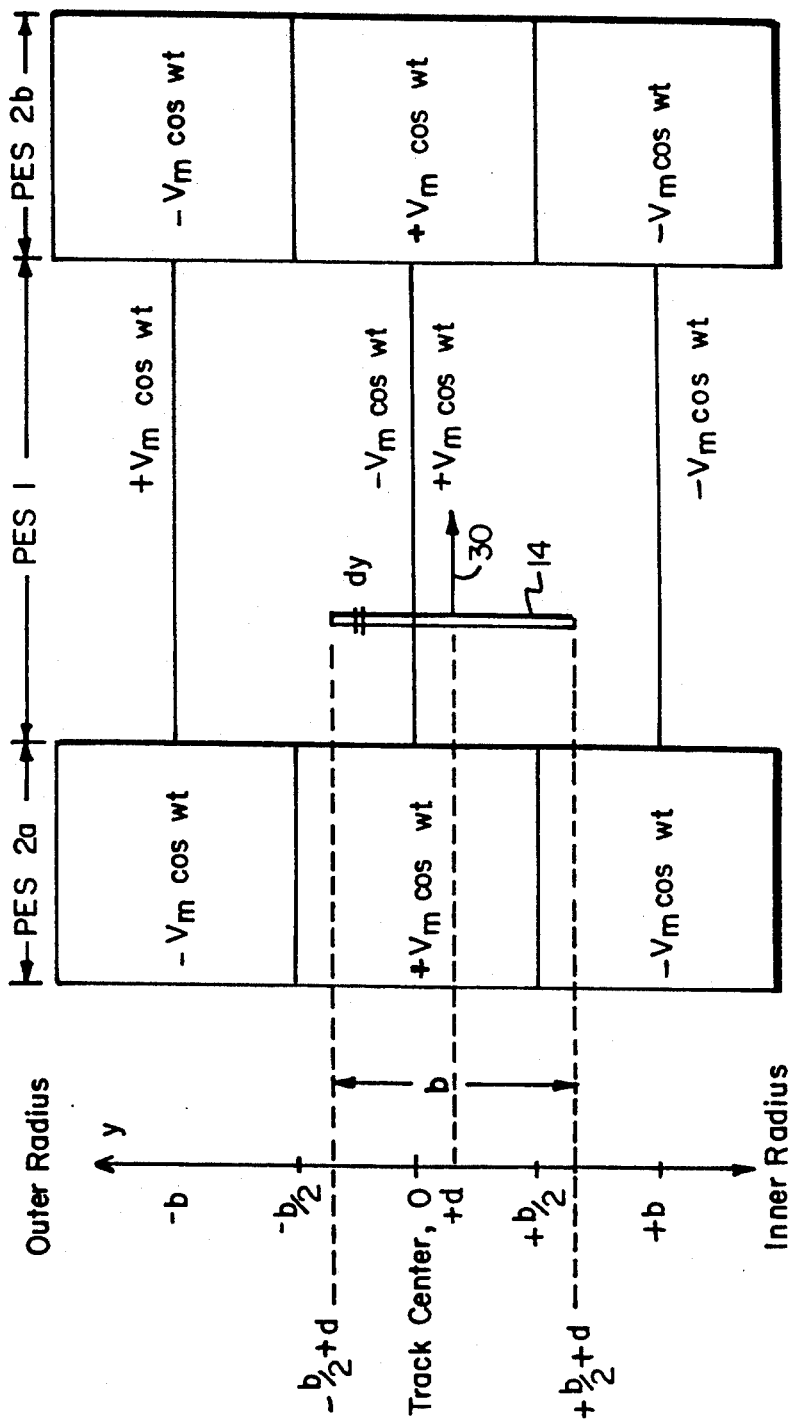
FIG. 5 is a diagram used to mathematically describe the amplitude of the transducer output signal as a linear function of the distance of the transducer center from the track center.

To express this mathematically, let d equal the distance from the center of transducer 14 to the nearest data track center (a boundary between the +Vm Cos (wt) and −Vm Cos (wt) regions in the PES1 field). Distance d may be positive (towards the inner radius) or negative (towards the outer radius). If b equals the width of transducer 14, then each read element dy contributes a fraction equal to dy/b towards the total output voltage provided by transducer 14. The integral for the PES1 field as shown in FIG. 5 is solved as follows:

$$V(t) = \int_{-\frac{b}{2}+d}^{0} (-V_m)\cos\omega t \cdot \frac{dy}{b} + \int_{0}^{+\frac{b}{2}+d} (+V_m)\cos\omega t \cdot \frac{dy}{b} \qquad \text{Eq. 1}$$

$$= \frac{2d}{b} V_m \cos\omega t; \quad -\frac{b}{2} \le d \le +\frac{b}{2}$$

where
- b = core gap width of transducer 14
- Vm = maximum amplitude
- d = off track error
- w = frequency of position signal The results show that the position signal of transducer 14 V(t) has an amplitude which is a linear function of the off-track error, d. This effect can be seen visually in FIG. 4A where the signal amplitude in the PES1 field is proportional to the distance of the center of transducer 14 from the track center, radial position 3. Also, the polarity of the position signal generated by transducer 14 which corresponds to the PES1 field indicates the direction of the off-track error, d.

In reality, the amplitude of the position signal of transducer 14 does not change linearly across the full track width. It becomes nonlinear at some point near the outside 25 percent of the track, depending on the physical dimensions of transducer 14 and its relationship to the dimensions of the written magnetized pattern.

However, the presence of the quadrature field (PES2) allows servo position demodulator 22 to overcome this nonlinearity. FIG. 4A shows the quadrature relationship between the PES2A and 2B fields and the PES1 field. The amplitude of the position signal provided by transducer 14 in the PES2 field is at a maximum, and therefore in a nonlinear region when the amplitude in the PES1 field is at a minimum (and therefore in a linear region), and vice versa. Hence, either the quadrature or the normal field is always in a linear region and there is always a linear relationship between the position signal corresponding to one of the PES fields (PES1 or PES2) and the distance between the center of transducer 14 and the track center (the off-track error) no matter where transducer 14 is positioned across the radial width of a track on disk 16.

Demodulator Hardware Description

Figure 6A:
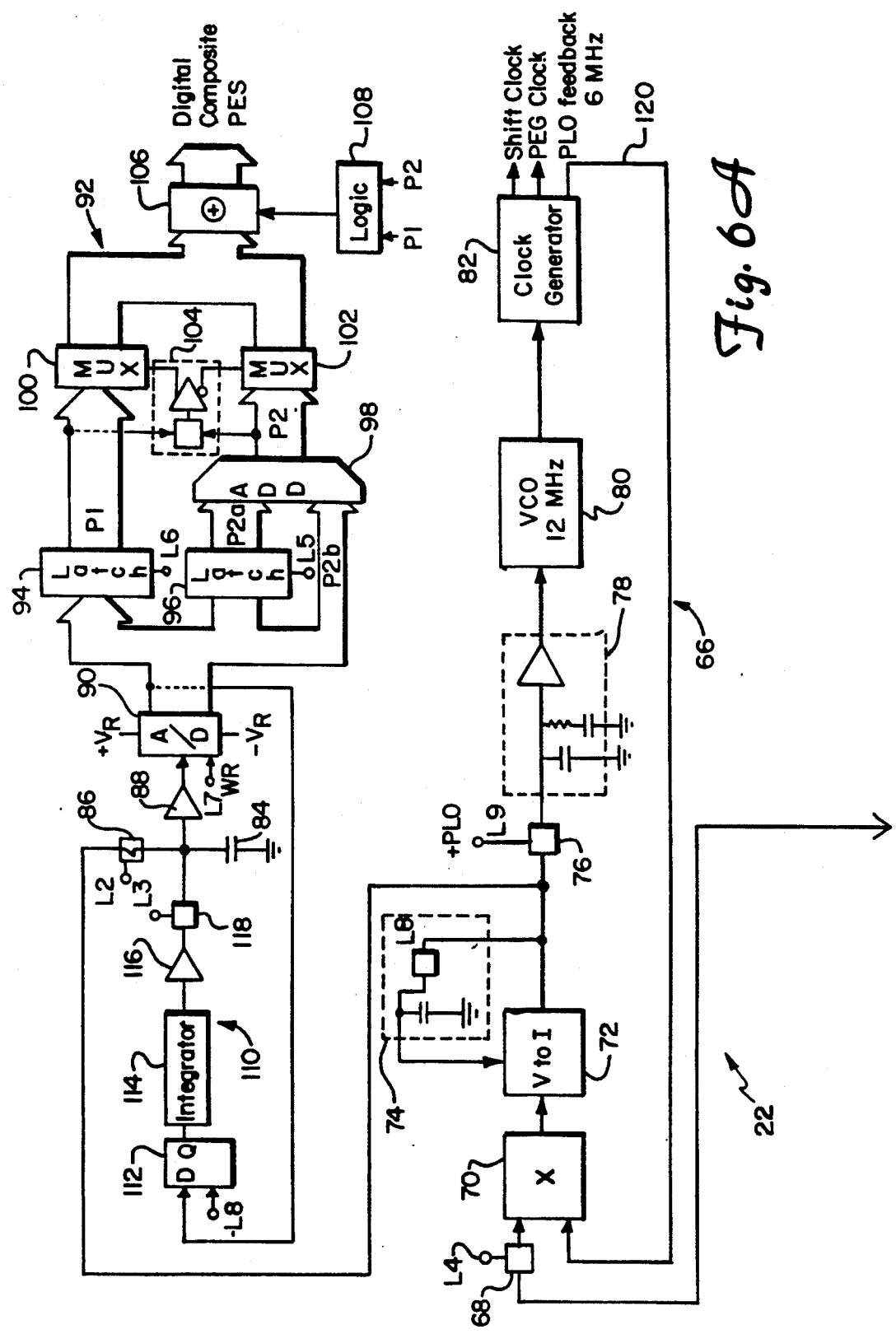
FIGS. 6A and 6B are a detailed block diagram of the servo position demodulator.
Figure 6B:
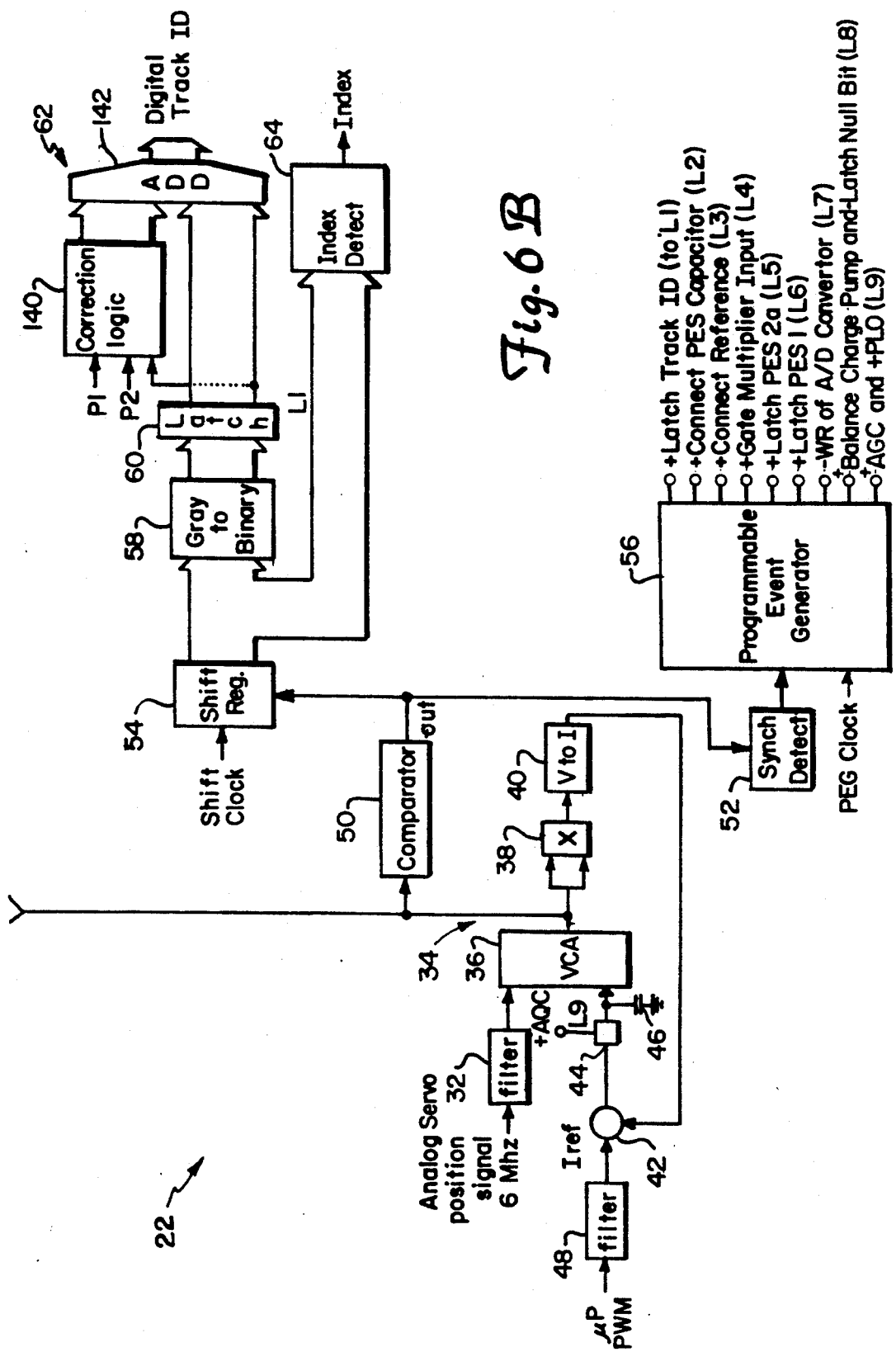

The demodulator hardware itself is described in this section. A detailed description of its operation is provided in section 4. FIGS. 6A and 6B a more detailed block diagram of servo position demodulator 22 which decodes position information represented by the analog position signal from transducer 14. The position signal from transducer 14 is applied to filter 32 where it is filtered to remove high frequency noise. The filtered signal is then applied to automatic gain control (AGC) loop 34.

Automatic Gain Control Loop

AGC loop 34 is comprised of voltage controlled amplifier 36, analog multiplier 38, voltage to current converter 40 and current summing junction 42. Analog switch 44 and capacitor 46 allow AGC loop 34 to be configured in an Acquire mode or a Hold mode (explained later).

An overall reference for the automatic gain controlled amplitude is provided through filter 48 by a microprocessor (not shown). The overall reference determines the final position gain in volts per microinch.

The AGC loop 34 is initially calibrated by the microprocessor and compensates for changes in input signal amplitude due to changes in track radius, flying height and other media properties.

PEG and Track ID Decoding

Once properly amplified, the automatic gain controlled (AGC'd) analog signal is transmitted to voltage comparator 50 which generates serial digital data corresponding to the AGC'd analog signal. Comparator 50 provides the serial digital data to synch detector circuit 52 and shift register 54.

Synch detector circuit 52 identifies the start of a servo sector and enables programmable event generator (PEG) 56. Programmable event generator 56 produces timing and window logic signals required for position demodulation in servo position demodulator 22.

Next, comparator 50 decodes track ID dibits as either logic or logic 0 depending on their amplitude. In this preferred embodiment, comparator 50 has a threshold of one half the maximum automatic gain controlled amplitude. The serial digital track ID bits are shifted into serial-to-parallel shift register 54 to produce a parallel track ID word. This track ID word is in Gray code and is converted to a binary track ID word by combinational logic 58. The binary track ID word is latched in latch 60 and provided to track ID correction logic 62 which will be explained in more detail later in the specification. The output of correction logic 62 is a track identification signal or absolute position signal which identifies the particular track over which transducer 14 is flying.

Shift register 54 is also used to provide index information to index pattern detector 64 which is not important to the present invention and will not be discussed further.

Phase Locked Oscillator Loop

The AGC'd analog signal is also transmitted to phase locked oscillator loop (PLO loop) 66. PLO loop 66 comprises analog switch 68, phase comparator/multiplier 70, voltage-to-current converter (charge pump) 72, which includes balance circuit 74 for balancing the voltage-to-current converter 72 once per servo sector so that there is zero current output for zero voltage input, analog switch 76, filter 78, voltage controlled oscillator 80 and clock generator 82. PLO loop 66 locks onto the phase and frequency of the analog signal provided by AGC loop 34. Then, analog switch 76 is opened allowing PLO loop 66 to open. The signal provided to voltage controlled oscillator 80 is then held constant. Hence, a constant frequency results at the output of voltage controlled oscillator 80. Therefore, the frequency of feedback 120 from clock generator 82 is also constant.

PES Generator

The output of voltage to current converter 72 is also provided to PES capacitor 84 through analog switch 86. Voltage is integrated on capacitor 84 during synchronous demodulation of PES fields 1, 2A and 2B. This voltage is applied through buffer 88 to analog-to-digital (A/D) converter 90. The output of A/D converter 90 is provided to composite PES generator logic 92. Composite PES generator logic 92 comprises latches 94 and 96, digital adder 98, multiplexers 100 and 102, multiplexer control logic 104, switchable inverter 106 and inverter control logic 108. The output of composite PES generator logic 92 is a composite PES word or fine position off-track error which represents the distance that transducer 14 is tracking from the track center.

The composite PES word, together with the corrected track ID word, form one digital position word which is typically 19 bits long. The digital position word defines the radial position of transducer 14 on disk 16 in a continuous fashion down to approximately one or two microinches of quantization.

DC Null Loop

PES capacitor 84 is also selectively connected to DC null loop 110 comprised of A/D convertor 90, one bit latch 112, integrator 114, buffer 116, analog switch 118 and buffer 88. DC null loop 110 drives the initial voltage on PES capacitor 84 to a midpoint between upper and lower reference voltages applied to an internal resistor ladder in A/D convertor 90.

Operation

PLO/AGC and Track ID Decoding

Figure 8:
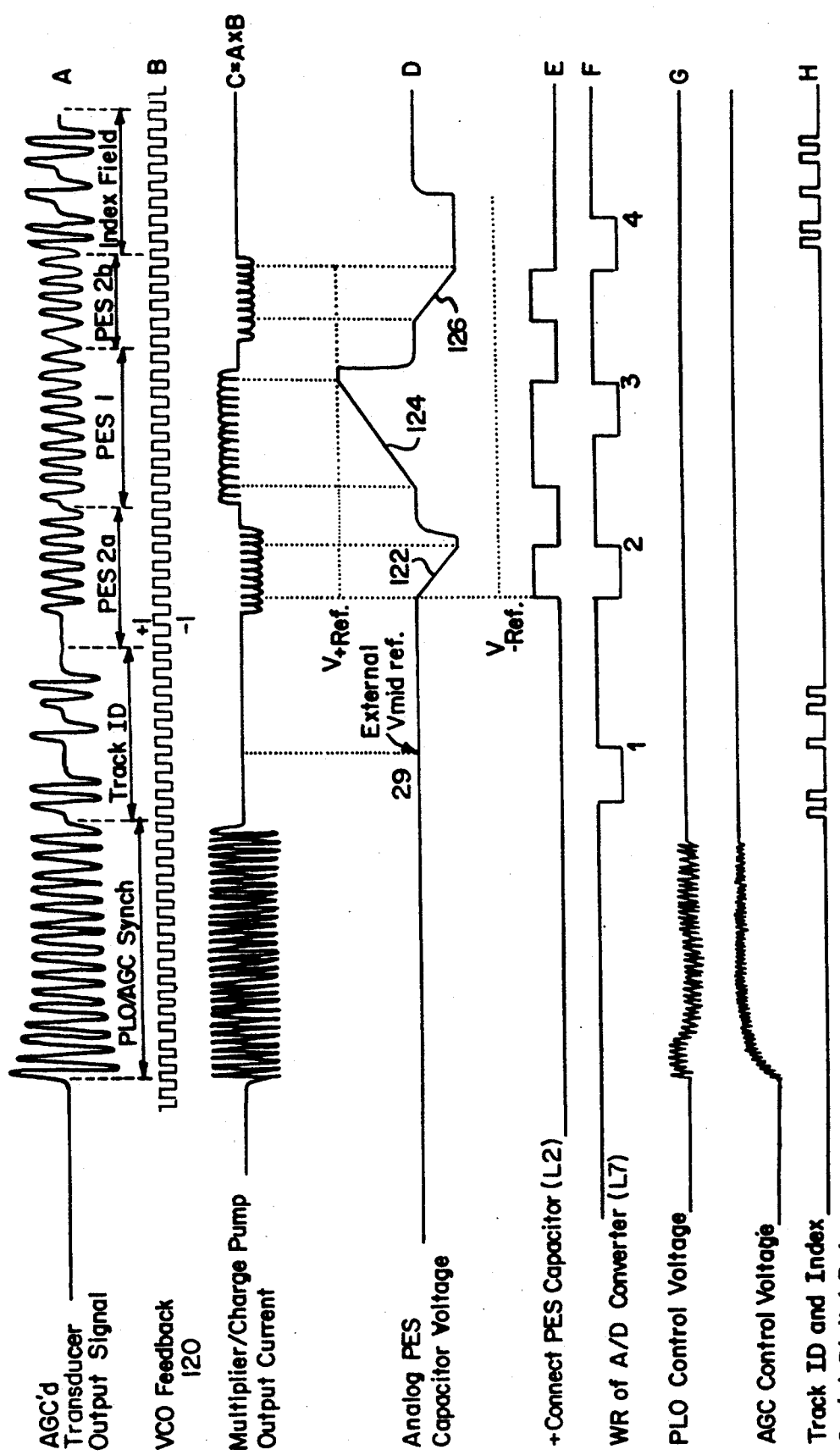
FIG. 8 is a timing diagram showing the relationship between events in the servo position demodulator.

Operation of the positioning system is described with reference to FIGS. 7 and 8. FIG. 7 is a timing diagram which shows the relationship between logic control signals generated by programmable event generator 56, the analog position signal and the PES capacitor voltage as transducer 14 moves over one servo sector. FIG. 8 is a timing diagram showing the relationship between various signals related to the synchronous demodulation of the fine position information in servo position demodulator 22 as transducer 14 moves along one servo sector.

As transducer 14 passes over the AGC/PLO synch field in the servo sector, programmable event generator 56 closes switch 44 to close AGC loop 34. AGC loop 34 acquires the proper gain so that the amplitude of the analog position signal is compensated for amplitude changes caused by changes in track radius, transducer flying height, and other media properties. Also, as transducer 14 flies over the AGC/PLO synch field, programmable event generator 56 closes analog switches 68 and 76 to close PLO loop 66. When PLO loop 66 is closed, voltage control oscillator 80 locks onto the phase and frequency of the analog position signal provided by AGC loop 34. PLO loop 66 uses digital feedback signal 120 which locks in at a 90° phase shift from the analog position signal provided by AGC loop 34.

After transducer 14 has passed over the PLO/AGC synch field, analog switches 44 and 76 are opened and both AGC loop 34 and PLO loop 66 enter a Hold mode. While in the hold mode the amplification in AGC loop 34 and the phase and frequency of VCO feedback 120 in PLO loop 66 remain constant.

Next, transducer 14 passes over the track ID field in the servo sector. The serial digital track ID bits are formed by comparator 50 and shifted into serial-to-parallel shift register 54. The Gray code track ID bits are converted into a binary code by convertor 58 and latched into latch 60.

PES Decoding

Finally, transducer 14 enters the PES fields in the servo sector. Switch 68 is closed applying the analog position signal to multiplier 70 while switch 76 remains open. The digital VCO feedback signal 120 is multiplied by the analog position signal in multiplier 70. Since the information in the PLO/AGC synch field is recorded 90° out of phase with the information in the PES fields, and since digital VCO feedback signal 120 is held with a 90° phase shift, the multiplication performed at multiplier 70 produces a full wave rectification of the analog position signal. This is shown by plot C in FIG. 8.

Figure 9A:
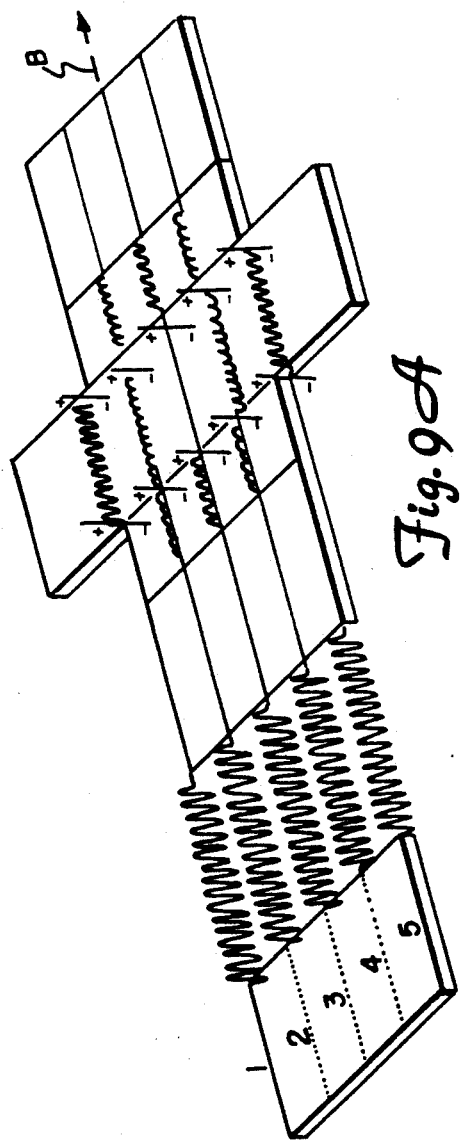
FIG. 9A is a graph showing the output of a multiplier in the servo position demodulator as a function of track radius.
Figure 9B:
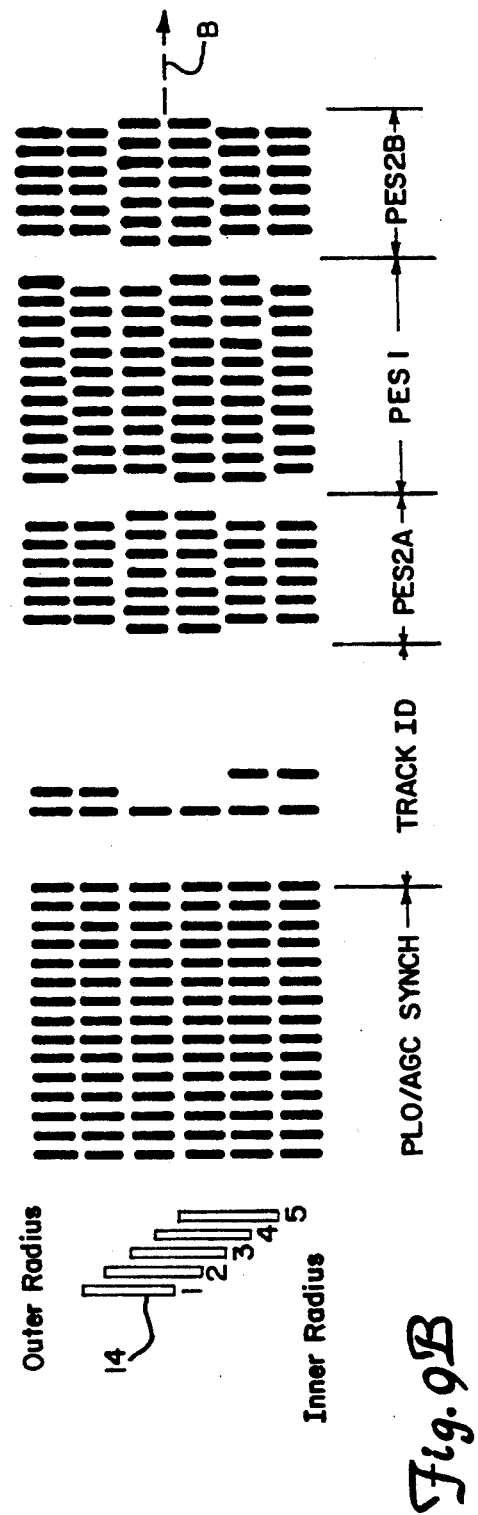
FIG. 9B is a diagram showing magnetized bits in a servo sector and the position of the transducer which corresponds to the positions graphed in FIG. 9A.

FIG. 9A illustrates the output of multiplier 70 for the five radial positions of transducer 14 which were described earlier with reference to FIG. 4A. Also, FIG. 9B shows the spacial relationship between the center of transducer 14 and the center of track B in radial transducer positions 1-5. In the PES fields, the amplitude of output signal multiplier 70 is proportional to the distance between the center of transducer 14 and the center of track B. The polarity of the DC component of the signal indicates the direction of the off-set. Hence, when the current provided by voltage-to-current converter 72 is applied to PES capacitor 84, the current is integrated, producing a positive or negative voltage ramp depending on the polarity of the current. Several such voltage ramps are indicated at points 122, 124 and 126 in FIG. 8. FIGS. 10A-10C illustrate the general case where n cycles of current are integrated to produce the analog voltage on PES capacitor 84 corresponding to one PES field. The integral is solved as follows:

$$V_{pes} = \frac{1}{C} \int^{n \text{ cycles}} i(t)dt = \frac{n}{c} \int^{1 \text{ cycle}} i(t)dt = \frac{n}{c} \int_{-\pi/2}^{+\pi/2} i(\theta) \frac{d\theta}{\omega} \qquad \text{Eq. 2}$$

$$= \frac{n}{c} \int_{-\pi/2}^{+\pi/2} \frac{2d}{b} Vmgm Cos\theta \frac{1}{\omega} d\theta = \frac{n}{c} \cdot \frac{2}{b} \cdot \frac{2Vmgm}{\omega} \cdot d$$

where,
n = # cycles measured
b = width of transducer 14
c = capacitance of PES capacitor 84
Vm = maximum AGC'd amplitude
gm = gain through charge pump 72
w = frequency of position signal.

The result shows that the final voltage on PES capacitor 84 is directly proportional to the off-track error, d, since n, c, b, Vm, gm and w are all constants. The relationship between the final analog voltage on PES capacitor 84 corresponding to the PES1 field and the off-track error, d, is graphically illustrated in FIG. 11. The voltage ramps for five radial positions in one servo sector are shown as they relate to off-track error, d.

The final voltage on PES capacitor 84 is also proportional to the number, n, of cycles integrated. In the PES1 field, n cycles are integrated and A/D converter 90 converts the analog voltage on PES capacitor 84 into a digital signal which is latched in latch 94. For the PES2 fields, first n/2 cycles (for PES2A) are integrated and A/D converter 90 converts the value to a digital signal which is latched in latch 96. Then, after the PES1 field is integrated, another n/2 cycles (for field PES2B) are integrated and another A/D conversion is made by A/D converter 90. The resulting digital signal is provided to adder 98 where the digital signal representing the PES2A field is added to it to produce the full PES2 position sample. The number of cycles, n, chosen should be high enough to achieve the averaging of possible media defects over several cycles. However, it must not be so high as to produce an overly long servo sector since the length of the servo sector limits the maximum radial velocity of transducer 14.

The final voltage on the PES capacitor 84 is also proportional to the capacitance of PES capacitor 84. Note that the same PES capacitor 84 is used to produce the analog PES voltage for both the PES1 and PES2 position samples. After the A/D conversion of the final ramp voltage of a PES measurement, the digital result is latched so the analog voltage on the PES capacitor 84 can be reset, and the same PES capacitor 84 can be re-used for the next PES measurement. This eliminates the possibility of position error due to capacitance mismatch which would result if two or more capacitors were used to produce the analog PES voltage. Using only one capacitor to integrate the position signal for both the quadrature and normal fields increases the accuracy with which transducer 14 follows the track.

Accordingly, only a single A/D converter 90 is required to convert the analog PES voltages to digital signals. This lowers the overall cost of servo position demodulator 22. Also, the A/D conversion made on A/D converter 90 is made early in the processing chain in servo position demodulator 22. The addition of the PES2A and PES2B samples and the formation of the composite PES signal all take place in the digital domain. This minimizes the amount of analog circuits and their associated errors such as off-set errors, gain errors, linearity errors and variation with temperature. Additionally, all of the digital circuits can be fabricated into one compact integrated circuit to save space.

DC Null Loop

Figure 12A:
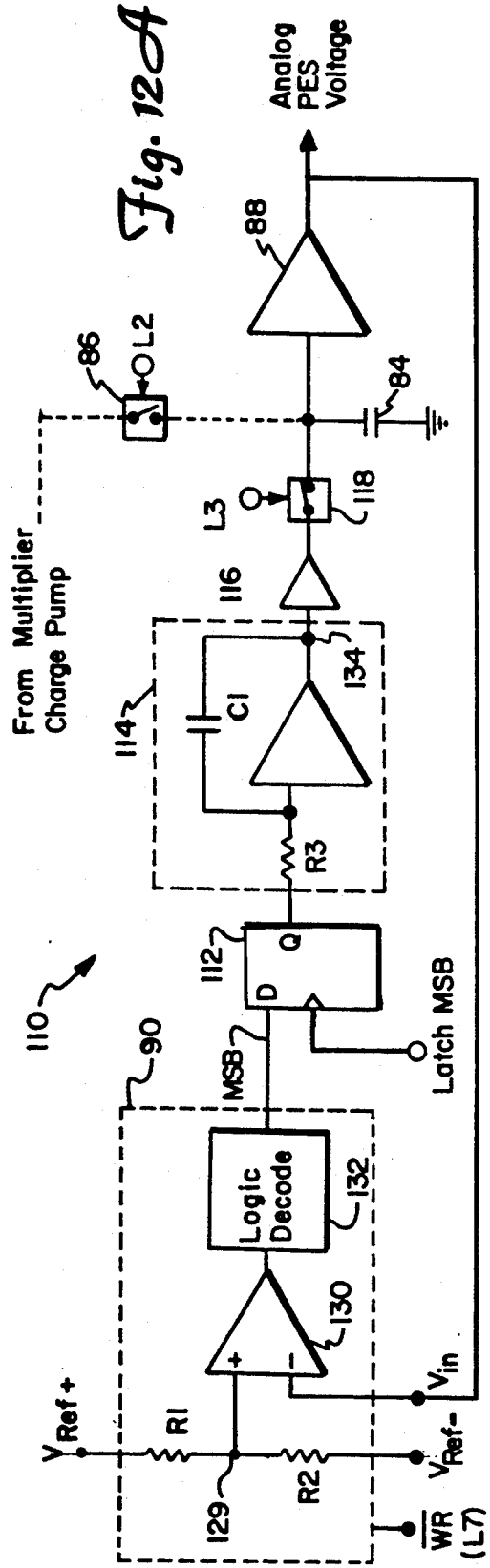
FIG. 12A is a more detailed block diagram of the DC null loop.
Figure 12B:
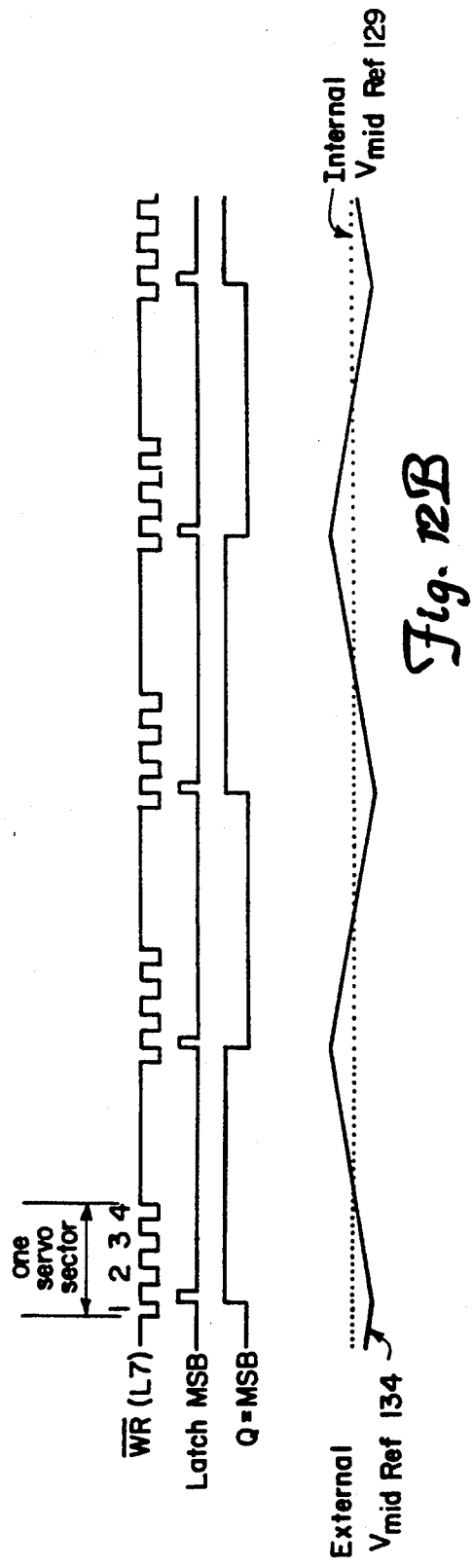
FIG. 12B is a timing diagram showing the relationship between, key signals in the DC null loop.

DC voltage off-sets in buffer 88 and analog switch 118 would create an off-set error in the final digital composite PES signal. Therefore, DC null loop 110 is provided. FIG. 12A shows a more detailed block diagram of null loop 110, and FIG. 12B is a timing diagram showing the relationship between signals occurring in DC null loop 110. As transducer 14 passes over each servo sector, and before it reaches the PES fields, programmable event generator 56 closes analog switch L3 connecting PES capacitor 84 to the output voltage of integrator 114.

Next, programmable event generator 56 generates a signal on output L7 causing A/D converter 90 to perform a first A/D conversion. A/D converter 90 comprises a resistor ladder connected between reference voltages VREF+ and VREF−, 15 comparators including most significant bit comparator 130, and logic decode 132 which decodes a most significant bit of A/D converter 90. Resistors R1 and R2 which represent the resistor ladder condensed into two resistors, act as a voltage divider creating a voltage midpoint Vmidref at node 129.

After the first A/D conversion, the most significant bit of A/D converter 90 is decoded and latched into single bit latch 112. The value of the latched most significant bit depends on whether signal Vin is greater or less than the internal Vmidref located at node 129. During initial calibration of servo position demodulator 22, the reference current in AGC loop 34 is set so that the A/D converter 90 full digital scale corresponds to one half of a servo track. The internal Vmidref corresponds to the track center or zero position error. The latched, most significant bit is applied to integrator 114. The output of integrator 114, external Vmidref at node 134, is driven towards the value of internal Vmidref. The gain through integrator 114 is chosen so that external Vmidref just crosses the voltage level of internal Vmidref before the next servo sector. This is shown in FIG. 12B. The peak-to-peak limits of external Vmidref must be kept much lower than the analog value of a least significant bit of A/D converter 90. This keeps the initial voltage on PES capacitor 84 as close as possible to the exact center of the digital scale.

After the first A/D conversion is completed, switch 118 is opened and switch 86 (via output L2 from PEG 56) is closed, and A/D converter 90 is available for conversions 2, 3 and 4 which are conversions for the position samples read from the PES2A, PES1 and PES2B fields. Between position samples, analog switch 118 closes to reset PES capacitor 84 to external Vmidref. Hence, DC null loop 110 compensates for static or time variable DC off-sets in buffer 88 and analog switch 118 which are inside DC null loop 110. This increases the track following accuracy of transducer 14.

The technique of time multiplexing A/D converter 90 between DC null loop operation and PES conversions eliminates the need for two separate A/D converters to perform these tasks. This reduces the cost of servo position demodulator 22.

As described earlier, after PES capacitor 84 is reset to external Vmidref, switch 118 is opened, the output of voltage to current converter 72 is connected to PES capacitor 84 through analog switch 86 and the PES capacitor voltage ramps up or down as shown in FIG. 8. The difference between the final voltage on PES capacitor 84 and the initial voltage is proportional to the distance of the center of transducer 14 from the track center.

Correlation of Track ID With PES Information

Figure 13A:
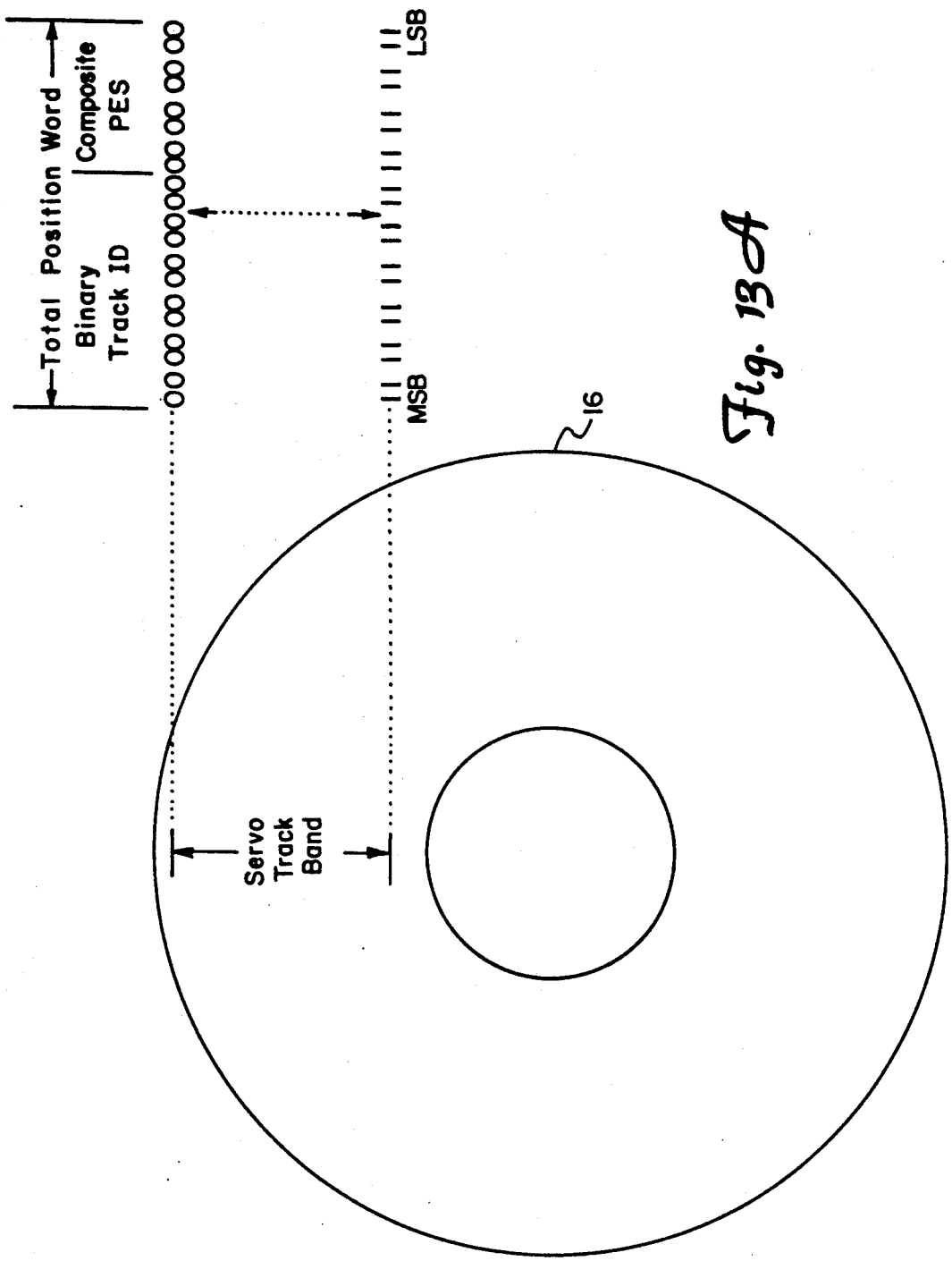
FIG. 13A shows the concept of a total position word.

FIG. 13A shows the concept of a total position word. The track ID number and the digital value representing the PES field samples are combined to define the radial position of transducer 14 anywhere on disk 16. The track ID number defines the track and the PES samples define the position within the track.

However, a problem can still arise. As transducer 14 flies over the track on disk 16, it moves over the track ID field prior to moving over the PES fields. Hence, the track ID information is decoded earlier in time than information read from the PES fields. Since the information read from the PES fields is read later in time, it is more recent and, hence, more accurate position information than that read from the track ID field. When transducer 14 is moving radially, it has a slanted trajectory across the servo sector. Therefore, it may enter the servo sector in the track ID field of one track but cross a boundary between tracks and exit the servo sector from the PES field of the next track. This will result in an occasional mismatch between the track boundary defined by the track identification information and that defined by the PES fields. It then becomes necessary to correct the track ID number so that it corresponds to the track from which transducer 14 reads the PES field samples.

In the present invention, correction logic 140 (shown in FIGS. 6A, 6B and 13D) is used to detect when it is necessary to correct the track ID so that it corresponds to the track number from which the PES field samples were read. FIG. 13B1 is a graph of the amplitude of the position signal corresponding to the PES fields, in 2's complement form, as it relates to the least significant bit in the track ID signal. FIG. 13B3 also shows a corrected least significant bit in the track ID signal.

Trace A represents the 2's complement form of the amplitude of the position signal corresponding to the PES1 field. Trace B represents the 2's complement amplitude corresponding to the PES2 field (PES2A + PES2B). The truth table shown in FIG. 13C defines the conditions where the track ID information is not correlated with the PES field information and the correction word which is required.

Combinational logic 140, shown in FIG. 13D, forms a correction number of ±1 which is added to the track ID in adder 142. For all other cases, the number 0 is added to the track ID.

FIG. 13E shows one preferred hardware implementation of combinational logic 140. It should be noted that the addition of the correction word to the track ID could also be accomplished by software in servo control processor 24. This correlation allows servo control processor 24 to use bits of the digital composite PES signal along with a track ID to very precisely determine the position and velocity of transducer 14 even at high radial velocities. The increased accuracy of the total position signal at high radial velocities helps to minimize both the time and power required for performing a track seek operation. At low radial velocities, such as at the end of a track seek operation, this correlation permits a smoother settling of the transducer on track.

Forming Composite PES Signal

FIG. 14A1–14A3 is an imaginary tracing of digitized final voltage values of the analog PES ramps generated at PES capacitor 84 for all radial positions of transducer 14 across four adjacent tracks in a servo-on-date system. These imaginary tracings are called track crossing plots. The digital values are in 2's complement form and the point at which the track crossing plot for the PES1 field crosses 00 hex represents the track center.

Demodulation of the PES2A field produces the PES2A track crossing plot shown in graph G1 of FIG. 14A1. Similarly, demodulation of the PES1 and PES2B fields produces the PES1 and PES2B track crossing plots, respectively. These three track crossing plots represent all possible ideal digital input combinations to the composite PES generator 92.

Graph G1 in FIG. 14A1 shows the three track crossing plots condensed onto a single plane. Since there are equal number of cycles in field PES2A and PES2B, their corresponding track crossing plots coincide. However, since the integration measurement time period for the PES2A and PES2B fields is only one half that of the PES1 field, the slope of the PES2A and PES2B track crossing plots in volts per microinch is only one half that of the PES1 track crossing plot.

In this invention, the PES2A position sample is added to the PES2B position sample to produce the total PES2 or quadrature sample. One hardware implementation to perform this addition was discussed with reference to FIGS. 6A and 6B. This addition can also be performed graphically. Graph G2 in FIG. 14A2 shows that the addition of the PES2A and PES2B track crossing plots produces a new track crossing plot which has the same slope as the PES1 track crossing plot.

The PES1 and PES2 track crossing plots shown in graph G2 in FIG. 14A2 are the inputs to composite PES generator 92. However, at any one radial position along disk 16, only one of the two plots is in a region where the PES amplitude is changing linearly with transducer position. There are eight distinct regions labeled a through h which repeat across the track. By monitoring the amplitude and polarity of the PES1 and PES2 samples, composite PES generator 92 determines over which of the eight regions transducer 14 is flying. Composite PES generator 92 then creates a composite position error sample output which is the standardized form of position error sample required by servo control processor 24. Composite PES generator 92 accomplishes this by inverting the slope or changing the sign bit of the PES1 or PES2 track crossing plots when necessary, and combining the linear portions to create the desired composite PES track crossing plot shown in graph G3 in FIG. 14A3.

Figure 15A:
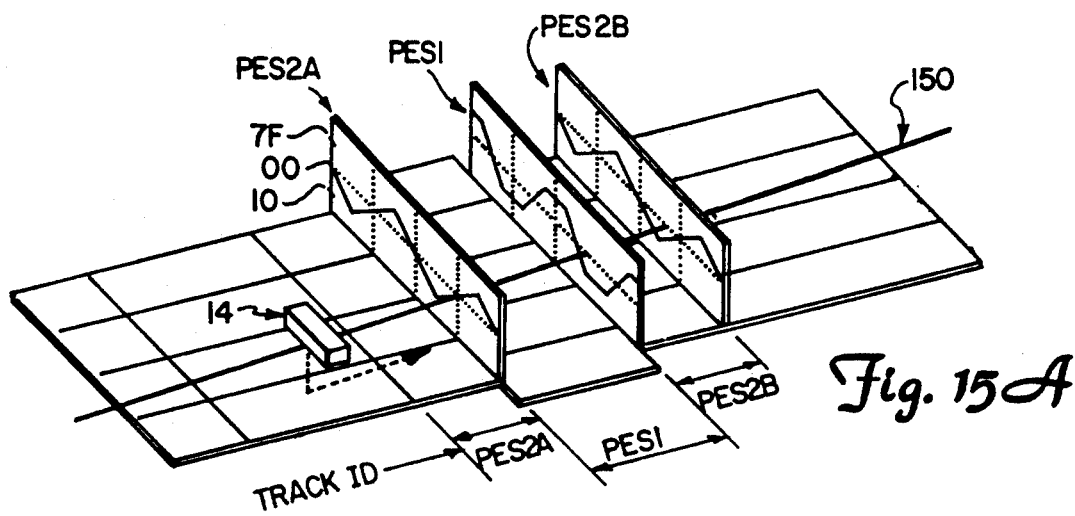
FIG. 15A shows transducer trajectory over a servo sector caused by radial movement of the transducer as the disk rotates.
Figure 15B:
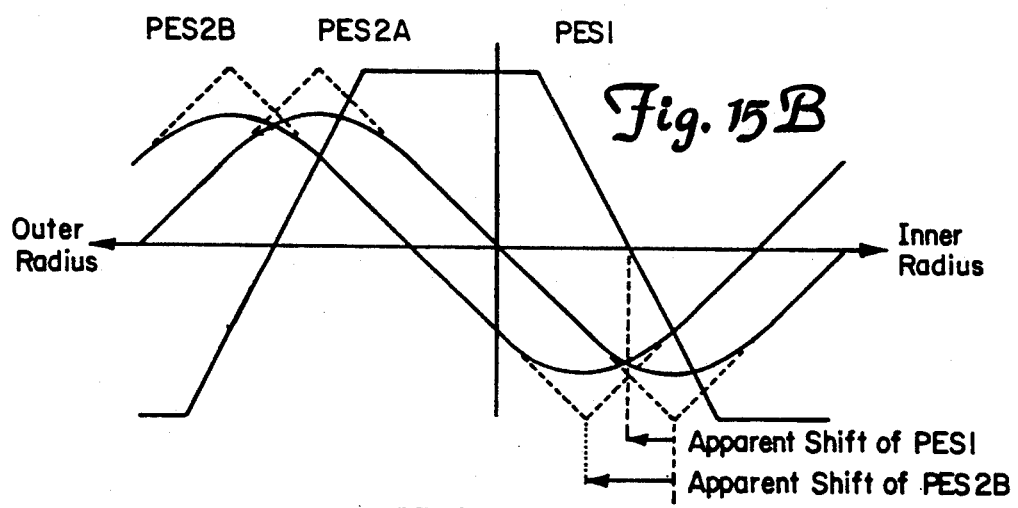
FIG. 15B is a plot showing the effect of radial velocity of the transducer on the PES track crossing plots.
Figure 15C:
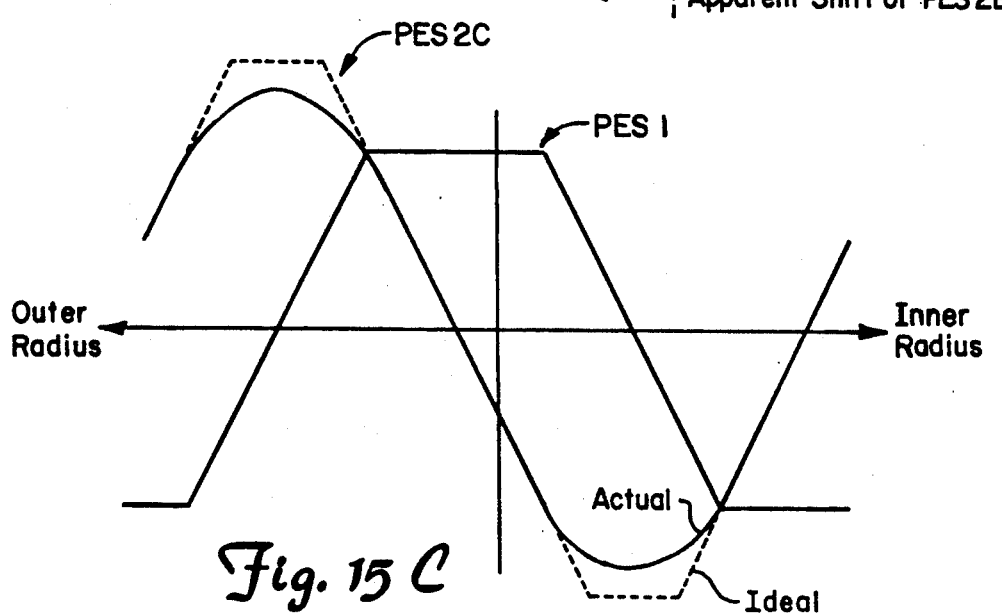
FIG. 15C shows the corrected PES track crossing plots after being compensated for radial velocity of the transducer.

FIGS. 15A through 15C show how the addition of the PES2A and PES2B field samples helps to compensate for high radial velocity of transducer 14. A slanted trajectory of transducer 14 is shown by arrow 150 in FIG. 15A. This slanted trajectory causes an apparent shift in the PES1 and PES2B track crossing plots as shown in FIG. 15B. The actual value of PES2A and 2B is shown by a solid line and the ideal value is shown by a dashed line. By adding the PES2A track crossing plot with the shifted PES2B track crossing plot, a new track crossing plot, PES2C is formed as shown in FIG. 15C. The new track crossing plot PES2C has the correct orientation with respect to the PES1 track crossing plot. By using this technique, the composite PES output is generated correctly, independent of the radial velocity of transducer 14. Without this feature, nonlinearities in the composite PES output would occur due to the slanted trajectory of transducer 14. This allows more efficient actuator control during track seek operations.

This invention is not limited for use in dedicated servo systems such as the one shown in FIG. 1. This invention may also be used in hybrid servo configurations. A hybrid system has a dedicated surface containing servo sectors and other disks which contain one or more similar servo sectors per revolution which are decoded for data transducer thermal off-set compensation. Since a common servo sector pattern is used, through the use of time multiplexing only one servo position demodulator is needed.

This invention may also be used in servo-on-data type servo systems where each disk surface has servo sectors. In this type of system, customer data is written between the write-protected servo sectors. Any head actively reading or writing customer data is also acting as its own track following error sensor. This increases track following precision and allows higher track densities to be achieved.

Another servo system configuration in which this invention may be used is one having multiple independent actuators 200. This is shown in FIG. 17. If a multiple actuator system contains n actuators 200 and corresponding amplifiers 202, the servo sectors under transducers 204 on adjacent actuators are staggered by 1/n of the distance between servo sectors on one disk. The servo sectors for adjacent actuators must not overlap. This is illustrated in FIG. 18. In this type of system, a multiplexer 204 continuously cycles through the servo sectors of the actuators. The advantage of this configuration is that only one control processor 24, along with digital demultiplexer 206, D/A converters 208, amplifiers 202 and one servo demodulator 22 are needed to control several actuators 200 (again through the use of time multiplexing).

The servo sector format described in this invention may be used with linear or rotary actuators.

A method for creating the composite PES output for a dedicated servo system is shown in FIGS. 16A1–16C. The servo track width can be twice the data track width. The servo transducer 14 is then twice as wide as a data transducer 18. This can help minimize nonlinear effects of fringing fields read by the edges of transducer 14. It can also improve the signal-to-noise ratio of the track ID bits. In this case, the composite PES generator 92 merely inverts the slope of the d, e, f and g segments. The servo track centers are derived alternately from PES1 and PES2 samples.

For a servo-on-data system, the transducer is used for both serving and reading and writing customer data. The servo track and data track are automatically the same width. The composite PES track crossing plot is then formed as shown in graph G3 in FIG. 14A3. Slope segments a and d are repositioned to extend the linearity of the b and c segments. This produces a linear PES plot across the full track width. Similarly, the e and h segments extend the linearity of the f and g segments. The track center is always derived from the PES1 sample. One advantageous feature of this method is that the composite PES has one more bit of quantization than the A/D converter used in the servo position demodulator 22.

CONCLUSION

The present invention uses only one integrating capacitor for integrating position error signals in both the quadrature and normal fields in servo position demodulator 22. This eliminates any position error caused by differences in capacitance in theoretically matched capacitors used in prior systems.

Also, only a single A/D converter is used in the present invention. A/D converter 90 is time multiplexed into the DC null loop as well as the PES conversions. This reduces the cost of servo position demodulator 22.

Further, the A/D conversion for the PES samples is completed early in the signal processing chain. This minimizes errors attributable to analog electronics in the processing chain.

In addition, the present invention incorporates a nulling system which compensates for static or time variable DC off-sets in the electronics surrounding the integrating capacitor. This increases the track following accuracy of positioning system 8.

Although the present invention has been described with reference to preferred embodiments, workers skilled in the art will recognize that changes may be made in form and detail without departing from the spirit and scope of the invention.

What is claimed is:

1. A demodulating system for demodulating position information signals provided by a transducer in response to position information read from position error fields on a disk in a data storage system, comprising:
    sign retention rectifier means, coupled to the transducer, for rectifying the position information signals to provide rectified position signals;
    an integrating capacitor, coupled to the sign retention rectifier means, for integrating the rectified position signals to produce position error signals, the integrating capacitor being used to integrate the rectified position signals corresponding to position information read from the position error fields;
    converter means, comprising an analog-to-digital (A/D) converter coupled to the integrating capacitor, for converting the position error signals into logical output signals representative of the position error signals; and
    nulling means, selectively coupled to the integrating capacitor, for providing the integrating capacitor with a reference signal to initialize the integrating capacitor, the A/D converter of the converter means being time mulitplexed between use in the nulling means and the converter means.

2. The system of claim 1 wherein the integrating capacitor is selectively coupled to the sign retention rectifier means.

3. The system of claim 2 wherein the position error fields comprise:
    a normal field; and
    a quadrature field.

4. The system of claim 1 and further comprising: amplifier means, coupled to the transducer and the sign retention rectifier means, for amplifying the position information signals.

5. A demodulating system for demodulating position information signals provided by a transducer in response to position information read from a disk in a data storage system, comprising:
    amplifier means, coupled to the transducer, for amplifying the position information signals to provide amplified position signals;
    sign retention rectifier means, coupled to the amplifier means, for rectifying the amplified position signals to provide rectified position signals;
    first integrating means, selectively coupled to the sign retention rectifier means, for integrating the rectified position signals to produce position error signals;
    converter means, comprising an analog-to-digital (A/D) converter coupled to the first integrating means, for converting the position error signals into logic output signals representative of the position error signals; and
    nulling means, selectively coupled to the first integrating means, for providing the first integrating means with a reference signal to initialize the first integrating means, the A/D converter of the converter means being time multiplexed between use in the nulling means and the converter means.

6. The demodulating system of claim 5 wherein the nulling means further comprises:
    null storage means, coupled to a bit of the A/D converter, for storing the logic level of the bit;
    second integrating means, coupled to the null storage means and selectively coupled to the first integrating means, for selectively providing the reference signal to the first integrating means, the reference signal being determined based on the logic level stored in the null storage means; and
    feedback means, coupled to the first integrating means and the A/D converter, for feeding the voltage across the first integrating means back to the A/D converter for comparison with a reference signal representing zero position error, the comparison determining the logic level of the bit the A/D converter stored in the null storage means.

7. The demodulating system of claim 5 wherein the converter means further comprises:
    storing means, coupled to the A/D converter, for storing logic information representative of the logic output signals; and composite generator means, coupled to the storing means, for combining the logic information to form a composite position error signal representative of the position information read from the disk.

8. A demodulating system for demodulating position information signals provided by a transducer in response to position information read from a quadrature field and a normal field on a disk in a data storage system, comprising:
    sign retention rectifier means, coupled to the transducer, for rectifying the position information signals to provide rectified position signals;
    integrating means, coupled to the sign retention rectifier means, for integrating the rectified position signals to produce position error signals;

converter means, comprising an analog-to-digital (A/D) converter and coupled to the integrating means, for converting the position error signals to digital logic signals representative of the position information read from both the quadrature field and the normal field;

nulling means, coupled to the integrating means, for selectively providing the integrating means with a reference signal to initialize the integrating means where the A/D converter is time multiplexed between the converter means and use in the nulling means; and composite generator means, coupled to the converter means, for combining the digital logic signals to form a composite position error signal representative of the position information read from both the quadrature field and the normal field where the composite generator means combines the digital logic signals after they have been converted by the converter means.

9. A positioning system for demodulating position information signals provided by a transducer in response to position information read from position error fields on a disk in a data storage system and for positioning the transducer over the disk in response to the demodulated position information, comprising:

amplifier means, coupled to the transducer, for amplifying the position information signals to provide amplified position signals;

sign retention rectifier means, coupled to the amplifier means, for rectifying the amplified position signals to provide rectified position signals;

an integrating capacitor, selectively coupled to the rectifier means, for integrating the rectified position signals to produce position error signals, the integrating capacitor being used to integrate the rectified position signals corresponding to position information read from the position error fields;

converter means, comprising an analog-to-digital (A/D) converter and coupled to the integrating capacitor, for converting the position error signals to digital logic signals representative of the position error signals;

nulling means, coupled to the integrating capacitor, for selectively providing the integrating capacitor with a reference signal to initialize the integrating capacitor where the A/D converter is time multiplexed between use in the converter means and the nulling means; and controller means, coupled to the convertor means, for controlling transducer position based on the digital logic signals.

10. The positioning system of claim 9 wherein the position error fields further comprise:
a quadrature field; and
a normal field.

11. The positioning system of claim 10 wherein the (A/D) converter converts the position error signals into logic output signals representative of the position information read from both the quadrature field and the normal field and wherein the converter means further comprises:

storing means, coupled to the A/D converter, for storing logic information representative of the logic output signals; and composite generator means, coupled to the storing means, for combining the logic information to form a composite position error signal representative of the position information read from both the quadrature field and the normal field.

12. The positioning system of claim 11 wherein the nulling means further comprises:

null storage means, coupled to a bit of the A/D converter, for storing the logic level of the bit;

integrator means, coupled to the null storage means and selectively coupled to the integrating capacitor, for selectively providing the reference signal to the integrating capacitor, the reference signal being determined based on the logic level stored in the null storage means; and feedback means coupled to the integrating capacitor and the A/D converter, for feeding the voltage across the integrating capacitor back to the A/D converter for comparison with a reference signal representing zero position error, the comparison determining the logic level of the bit of the A/D converter.

13. The positioning system of claim 9 wherein the amplifier means further comprises:

filter means, coupled to the transducer, for filtering the position information signals to provide filtered signals; and automatic gain control means, coupled to the filter means, the controller means and the rectifier means, for varying amplification of the filtered signals.

14. The positioning system of claim 9 wherein the sign retention rectifier means further comprises:

digital oscillator means, selectively coupled to the amplifier means, for providing a digital oscillator signal which oscillates 90 degrees out of phase with the amplified position signals; and multiplier means, selectively coupled to the amplifier means, for multiplying the amplified position signals by the digital oscillator signal to provide the rectified position signals.

15. The positioning system of claim 14 wherein the digital oscillator means further comprises:

a phase locked oscillator loop for locking onto a signal 90 degrees out of phase with the amplified position signals.

* * * * *